United States Patent
Seo et al.

(10) Patent No.: US 10,200,176 B2
(45) Date of Patent: *Feb. 5, 2019

(54) METHOD AND APPARATUS FOR REDUCING INTER-CELL INTERFERENCE IN RADIO COMMUNICATION SYSTEM

(71) Applicant: LG ELECTRONICS INC., Seoul (KR)

(72) Inventors: Hanbyul Seo, Anyang-si (KR); Hakseong Kim, Anyang-si (KR); Inkwon Seo, Anyang-si (KR); Byounghoon Kim, Anyang-si (KR); Kijun Kim, Anyang-si (KR); Daewon Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/589,077

(22) Filed: May 8, 2017

(65) Prior Publication Data

US 2017/0244527 A1     Aug. 24, 2017

Related U.S. Application Data

(63) Continuation of application No. 14/597,831, filed on Jan. 15, 2015, now Pat. No. 9,667,396, which is a
(Continued)

(51) Int. Cl.
*H04L 5/00* (2006.01)
*H04J 11/00* (2006.01)
(Continued)

(52) U.S. Cl.
CPC .......... *H04L 5/0051* (2013.01); *H04J 11/005* (2013.01); *H04L 5/00* (2013.01);
(Continued)

(58) Field of Classification Search
CPC ........ H04B 1/0053; H04B 1/006; H04B 1/50; H04B 1/52; H04J 2203/0069;
(Continued)

(56) References Cited

U.S. PATENT DOCUMENTS

2003/0064734 A1    4/2003    Stilp et al.
2005/0003831 A1    1/2005    Anderson
(Continued)

FOREIGN PATENT DOCUMENTS

JP    2010-525633 A    7/2010
JP    2012-501601 A    1/2012
(Continued)

OTHER PUBLICATIONS

Alcatel-Lucent Shanghai Bell et al., "Discussion for response to LS (R1-093748) on unicast transmission in MBSFN subframes", 3GPP TSG-RAN WG RAN1 #58bis, R1-093759, Oct. 12-16, 2009, pp. 1-3.
(Continued)

*Primary Examiner* — Dady Chery
(74) *Attorney, Agent, or Firm* — Birch, Stewart, Kolasch & Birch, LLP

(57) ABSTRACT

A method of a first cell for supporting a downlink channel demodulation at a user equipment, the method includes transmitting, by the first cell to the user equipment via a higher layer signaling, information on a Cell-specific Reference Signal (CRS) of a second cell including Multicast/Broadcast over Single Frequency Network (MBSFN) subframe configuration information of the second cell; and transmitting, by the first cell to the user equipment, a downlink signal on the downlink channel, wherein the information on the CRS of the second cell is used by the user equipment to demodulate the downlink channel from the first cell.

10 Claims, 28 Drawing Sheets

Related U.S. Application Data continuation of application No. 15/582,340, filed as application No. PCT/KR2011/002029 on Mar. 24, 2011, now Pat. No. 8,965,294.

(60) Provisional application No. 61/391,077, filed on Oct. 8, 2010, provisional application No. 61/376,681, filed on Aug. 25, 2010, provisional application No. 61/330,901, filed on May 4, 2010, provisional application No. 61/320,776, filed on Apr. 5, 2010, provisional application No. 61/317,704, filed on Mar. 26, 2010, provisional application No. 61/317,241, filed on Mar. 24, 2010.

(51) Int. Cl.
*H04W 72/04* (2009.01)
*H04W 4/06* (2009.01)
*H04W 72/12* (2009.01)
*H04W 84/04* (2009.01)

(52) U.S. Cl.
CPC ............ *H04L 5/005* (2013.01); *H04L 5/0048* (2013.01); *H04W 4/06* (2013.01); *H04W 72/042* (2013.01); *H04W 72/0426* (2013.01); *H04L 5/0007* (2013.01); *H04W 72/1289* (2013.01); *H04W 84/045* (2013.01)

(58) Field of Classification Search
CPC .... H04J 11/005; H04L 5/0051; H04L 5/0048; H04L 5/005; H04L 5/0007; H04W 72/042; H04W 4/06; H04W 72/0426; H04W 84/045; H04W 72/1289
USPC ........ 370/329, 330, 339, 341–345; 455/63.1, 455/437–444
See application file for complete search history.

(56) References Cited

U.S. PATENT DOCUMENTS

| 2007/0223606 A1 | 9/2007 | Yang et al. |
|---|---|---|
| 2010/0020771 A1 | 1/2010 | Ji et al. |
| 2010/0034314 A1 | 2/2010 | Brown et al. |
| 2011/0218016 A1 | 9/2011 | Hirakawa et al. |
| 2011/0286349 A1 | 11/2011 | Tee et al. |
| 2013/0094389 A1 | 4/2013 | Parkvall et al. |

FOREIGN PATENT DOCUMENTS

| JP | 2014-168310 A | 9/2014 |
|---|---|---|
| KR | 10-2006-0082991 B1 | 8/2007 |
| WO | WO 2009/120791 A2 | 10/2009 |
| WO | WO 2010/006285 A2 | 1/2010 |
| WO | WO 2010/019019 A2 | 2/2010 |
| WO | WO 2010/025268 A1 | 3/2010 |
| WO | WO 2010/032791 A1 | 3/2010 |

OTHER PUBLICATIONS

Ericsson et al., "On CSI RS Design", 3GPP TSG-RAN WG1 #59bis, R1-100048, Jan. 18-22, 2010, p. 1-2.

LG Electronics, "Coordination for DL control channel in co-channel HeNB deployment," 3GPP TSG RAN WG1 Meeting #60bis, R1-102429, Beijing, China, Apr. 12-16, 2010, pp. 1-5, http://www.3gpp.org/ftp/tsg_ran/wg1_rl1/TSGR1_60b/Docs/R1-102429.zip.

Motorola, "Common Reference Symbol Mapping/Signaling for 8 Transmit Antennas," 3GPP TSG RAN1 #54, R1-083224, Jeju, Korea, Aug. 18-22, 2008, (5 pages), http://www.3gpp.org/ftp/tsg_ran/wg1_rl1/TSGR1_54/Docs/R1-083224.zip.

Qualcomm Europe, "Details of CSI-RS", 3GPP TSG-RAN WG1 #59, R1-094867, Nov. 9-13, 2009, pp. 1-6.

Samsung, "RE puncturing pattern for RS boosting", 3GPP TSG-RAN Working Group 1 #52bis, R1-081232, Mar. 31-Apr. 4, 2008, p. 1-3.

ZTE, "Resource Mapping Issues on JP transmission in CoMP," TSG-RAN WG1 Meeting #55bis, R1-090070, Ljubljana, Slovenia, Jan. 12-16, 2009, (3 pages), http://www.3gpp.org/ftp/tsg_ran/wg1_rl1/TSGR1_55b/Docs/R1-090070.zip.

QUALCOMM Europe, "2 Tx RSRP Measurements," 3GPP TSG-RAN WG4 #50, R4-090729, Athens, Greece, Feb. 9-13, 2009, pp. 1-4.

Research in Motion et al., "Type-II Relay Reference Signal Transmission and UE Association," 3GPP TSG RAN WG1 Meeting #57bis, R1-092419, Los Angeles, USA, Jun. 29-Jul. 3, 2009, pp. 1-5.

Huawei, "Consideration on CSI-RS design for CoMP and text proposal to 36.814," R1-092364, 3GPP TSG RAN WG1457bis, Los Angeles, USA, Jun. 29-Jul. 3, 2009, 9 pages.

Nokia Siemens Networks et al., "Coordinated Beamforming/ Scheduling performance evaluation," R1-100331, 3GPP TSG-RAN WG1 Meeting #59b. Valencia, Spain, Jan. 18-22, 2010, 8 pages.

FIG. 6
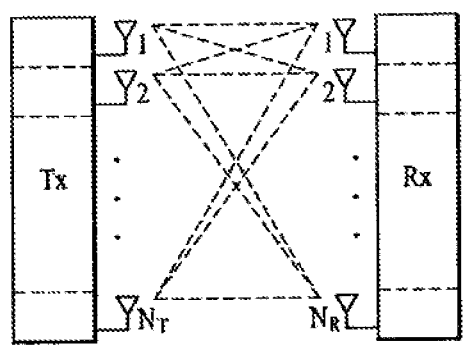
(a)
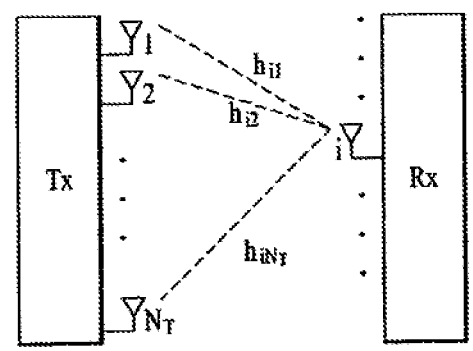
(b)

FIG. 7
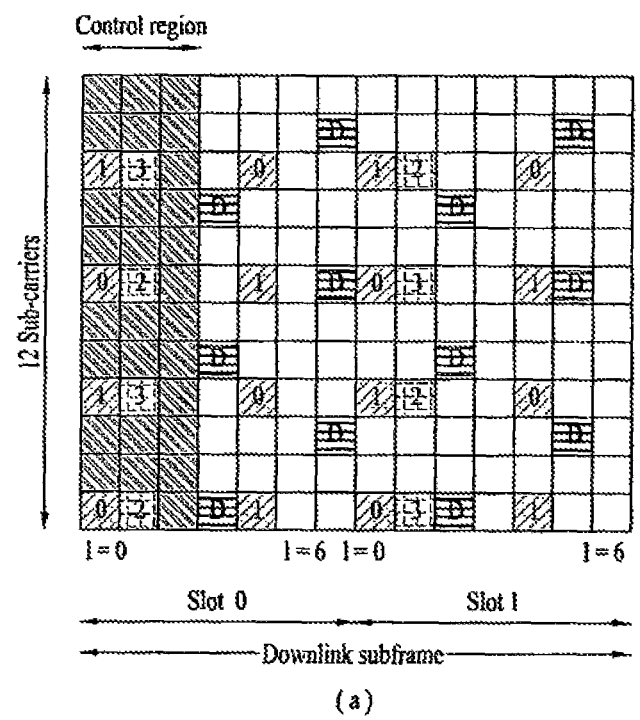
(a)
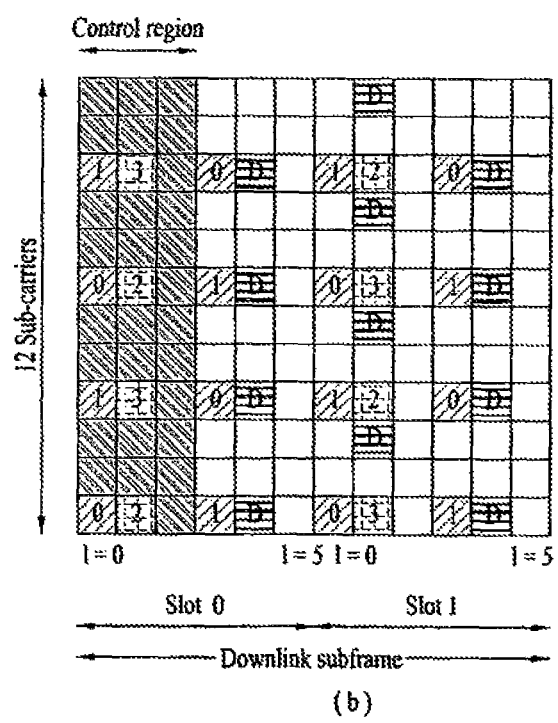
(b)

FIG. 21
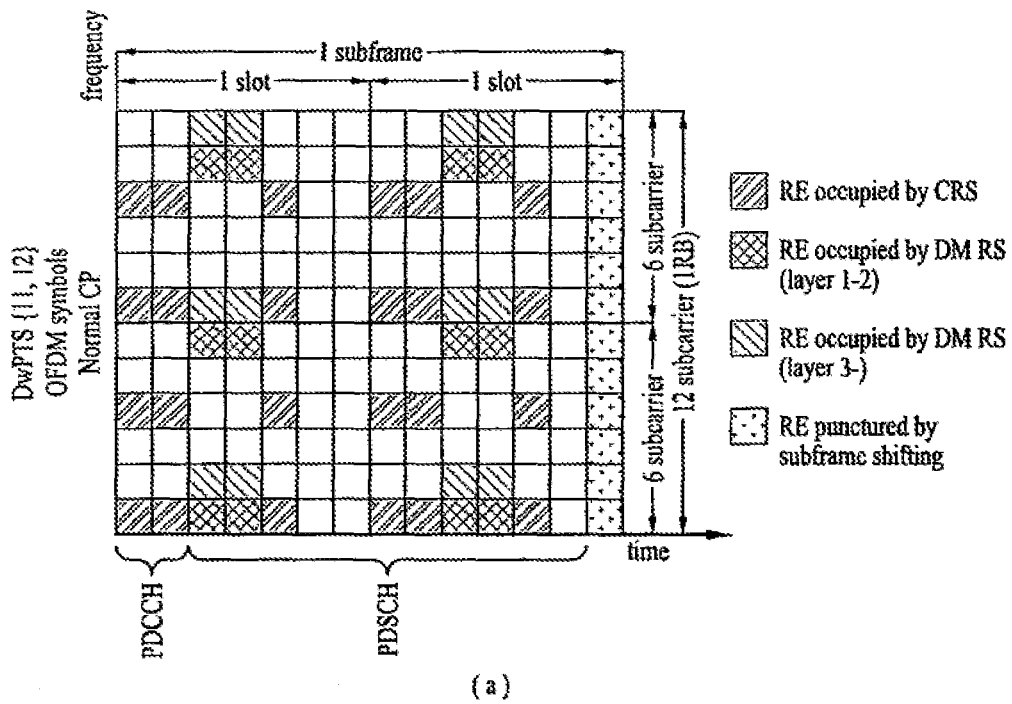
(a)
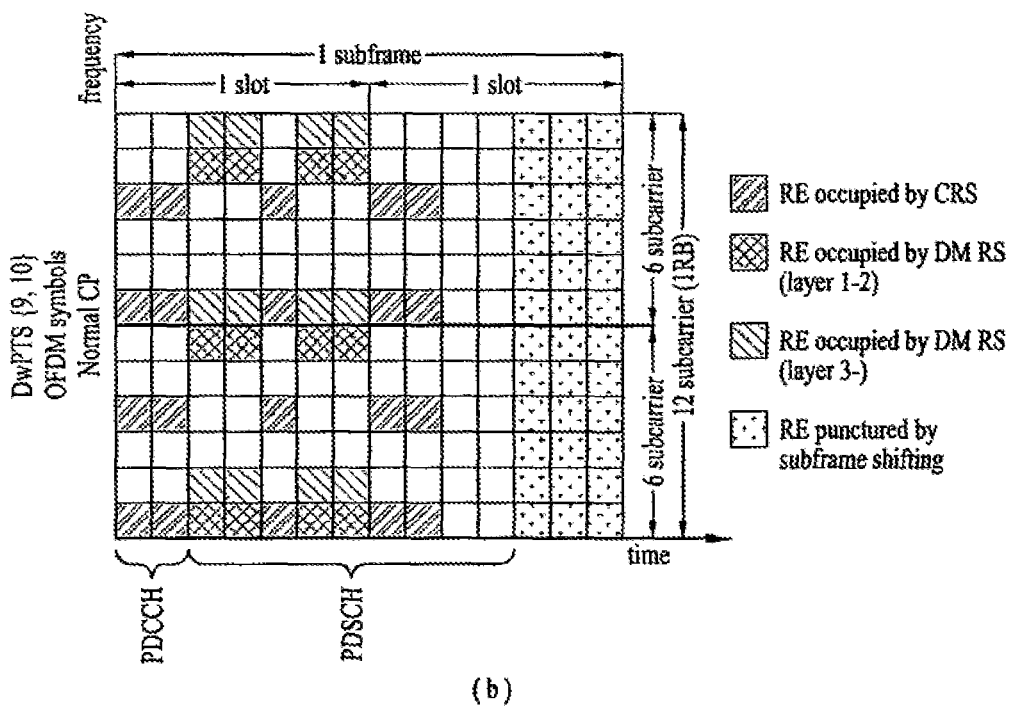
(b)

METHOD AND APPARATUS FOR REDUCING INTER-CELL INTERFERENCE IN RADIO COMMUNICATION SYSTEM

CROSS-REFERENCE TO RELATED APPLICATIONS

This Application is a Continuation of U.S. patent application Ser. No. 14/597,831 filed on Jan. 15, 2015 (now U.S. Pat. No. 9,667,396 issued on May 30, 2017), which is a Continuation of U.S. patent application Ser. No. 13/582,340 filed on Aug. 31, 2012 (now U.S. Pat. No. 8,965,294 issued on Feb. 24, 2015), which is the National Phase of PCT/KR2011/002029 filed on Mar. 24, 2011, which claims the benefit under 35 U.S.C. § 119(e) to U.S. Provisional Application Nos. 61/391,077 filed on Oct. 8, 2010, 61/376,681 filed on Aug. 25, 2010, 61/330,901 filed on May 4, 2010, 61/320,776 filed on Apr. 5, 2010, 61/317,704 filed on Mar. 26, 2010 and 61/317,241 filed on Mar. 24, 2010, all of which are hereby expressly incorporated by reference into the present application.

BACKGROUND OF THE INVENTION

Field of the Invention

The present invention relates to a radio communication system, and more particularly, to a method and apparatus for reducing inter-cell interference in a radio communication system.

Discussion of the Related Art

FIG. 1 illustrates a heterogeneous network wireless communications system 100 including a macro base station and a micro base station. In the description of the present invention, the term "heterogeneous network" refers to a network wherein a macro base station 110 and a micro base station 121 and 122 co-exist even when the same RAT (Radio Access Technology) is being used.

A macro base station 110 refers to a general base station of a wireless communication system having a broad coverage range and a high transmission power. Herein, the macro base station 110 may also be referred to a macro cell.

The micro base station 121 and 122 may also be referred to as a micro cell, a pico cell, a femto cell, a home eNB(HeNB), a relay, and so on. More specifically, the micro base station 121 and 122 corresponds to a small-sized version of the macro base station 110. Accordingly, the micro base station 121 and 122 may independently perform most of the functions of the macro base station. Herein, the micro base station 121 and 122 may correspond to an overlay base station, which may be installed in an area covered by the macro base station, or to a non-overlay base station, which may be installed in a shadow area that cannot be covered by the macro base station. As compared to the macro base station 110, the micro base station 121 and 122 has a narrower coverage range and a lower transmission power and may accommodate a smaller number of terminals (or user equipments).

A terminal (or user equipment) 131 may directly receive services from (or be served by) the macro base station 110 (hereinafter referred to as a macro-terminal). And, alternatively, a terminal (or user equipment) 132 may directly receive services from (or be served by) the micro base station 121 (hereinafter referred to as a micro-terminal). In some cases, a terminal 132 existing within the coverage area of the micro base station 121 may receive services from the macro base station 110.

Depending upon whether or not the terminal (or user equipment) has limited access, the micro base station may be categorized into two different types, the first type being a CSG (Closed Subscriber Group) micro base station, and the second type being an OA (Open Access) or OSC (Open Subscriber Group) micro base station. More specifically, the CSG micro base station may serve (or transmit services to) only specific terminals that are authorized, and the OSG micro base station may serve (or transmit services to) all types of terminals without any particular access limitations.

SUMMARY OF THE INVENTION

In the above-described heterogeneous network, if a macro-terminal served by a macro base station is adjacent to a micro base station, interference may occur in a downlink signal received by the macro-terminal from the macro base station due to a strong downlink signal from the micro base station. In addition, a micro-terminal served by the micro base station may be subject to interference by a downlink signal from the macro base station. Alternatively, an uplink signal from the macro-terminal served by the macro base station may subject the micro base station adjacent to the corresponding macro-terminal to strong interference.

An object of the present invention devised to solve the problem lies on a method and apparatus for minimizing interference with respect to another base station when a base station transmits signals to a terminal.

Another object of the present invention devised to solve the problem lies on a method for efficiently transmitting and receiving a signal on a backhaul link and an access link in a relay, if the relay performs a mixture of an in-band operation and an out-band operation on multiple carriers.

The object of the present invention can be achieved by providing a method for reducing inter-cell interference, including determining, by a first cell, REs (Resource Elements) of a downlink subframe of the first cell overlapped with CRS (Cell-specific Reference Signal) transmission REs of a downlink subframe of a second cell, determining, by the first cell, a portion of REs of the downlink subframe of the first cell overlapped with CRS transmission REs of the downlink subframe of the second cell as punctured REs, mapping, by the first cell, one or more downlink channel to the downlink subframe of the first cell other than the punctured REs, and transmitting, by the first cell, the one or more downlink channel mapped to the downlink subframe of the first cell to a UE (User Equipment).

In another aspect of the present invention, provided herein is an apparatus for reducing inter-cell interference a reception module for receiving uplink signal from a UE (User Equipment), a transmission module for transmitting downlink signal to the UE, and a processor for controlling signal reception and transmission of a first cell via the reception module and transmission module, wherein the processor configured to determine REs (Resource Elements) of a downlink subframe of the first cell overlapped with CRS (Cell-specific Reference Signal) transmission REs of a downlink subframe of a second cell, determine a portion of REs of the downlink subframe of the first cell overlapped with CRS transmission REs of the downlink subframe of the second cell as punctured REs, map one or more downlink channel to the downlink subframe of the first cell other than the punctured REs, and transmit, via the transmission module, the one or more downlink channel mapped to the downlink subframe of the first cell to the UE.

The following description may be commonly applied to embodiments of the present invention.

The punctured REs may include REs positioned in at least one of control region and data region of the downlink subframe of the first cell among the REs of the downlink subframe of the first cell overlapped with CRS transmission REs of the downlink subframe of the second cell.

The punctured REs may include REs corresponding to a portion of CRS transmit antenna ports among the REs of the downlink subframe of the first cell overlapped with CRS transmission REs of the downlink subframe of the second cell.

The punctured REs may be determined separately for different downlink subframe of the first cell.

The punctured REs may further include REs of the downlink subframe of the first cell overlapped with PDCCH (Physical Downlink Control Channel) transmitting region of the downlink subframe of the second cell.

The method may further include transmitting information indicating position of the punctured REs to the UE.

A boundary of the downlink subframe of the first cell may be shifted by a predetermined number of OFDM symbols from a boundary of the downlink subframe of the second cell.

The downlink subframe of the second cell may be configured as a MBSFN (Multicast/Broadcast over Single Frequency Network) subframe. REs other than CRS transmission REs of the downlink subframe in the second cell may be configured as null REs.

The method may further include transmitting DMRS (Demodulation Reference Signal) in the downlink subframe of the first cell, wherein the DMRS are transmitted according to one of DMRS patterns not overlapped with the punctured REs, and wherein the DMRS patterns are DMRS pattern for normal subframe, DMRS pattern for DwPTS (Downlink Pilot Time Slot) with length of 11 or 12 OFDM symbols, and DMRS pattern for DwPTS with length of 9 or 10 OFDM symbols.

The above general description of the present invention and a detailed description thereof which will be described hereinbelow are exemplary and are for an additional description of the invention disclosed in the accompanying claims.

According to the present invention, when a base station transmits signals to a UE, a method and apparatus for minimizing interference with another base station can be provided.

The effects obtained from the present invention are not limited to the above-described effect and other effects that are not mentioned herein will be clearly understood to those skilled in the art from the following description of the present invention.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 6 shows the configuration of a radio communication system having multiple antennas;

FIG. 7 shows patterns of CRSs and DRSs defined in the existing 3GPP LTE system;

FIG. 21 shows a DMRS pattern for a DwPTS;

FIG. 24 shows exemplary subframe shifts according to the present invention;

FIG. 25 shows exemplary subframe shifts according to the present invention;

DETAILED DESCRIPTION OF THE INVENTION

Figure 1:
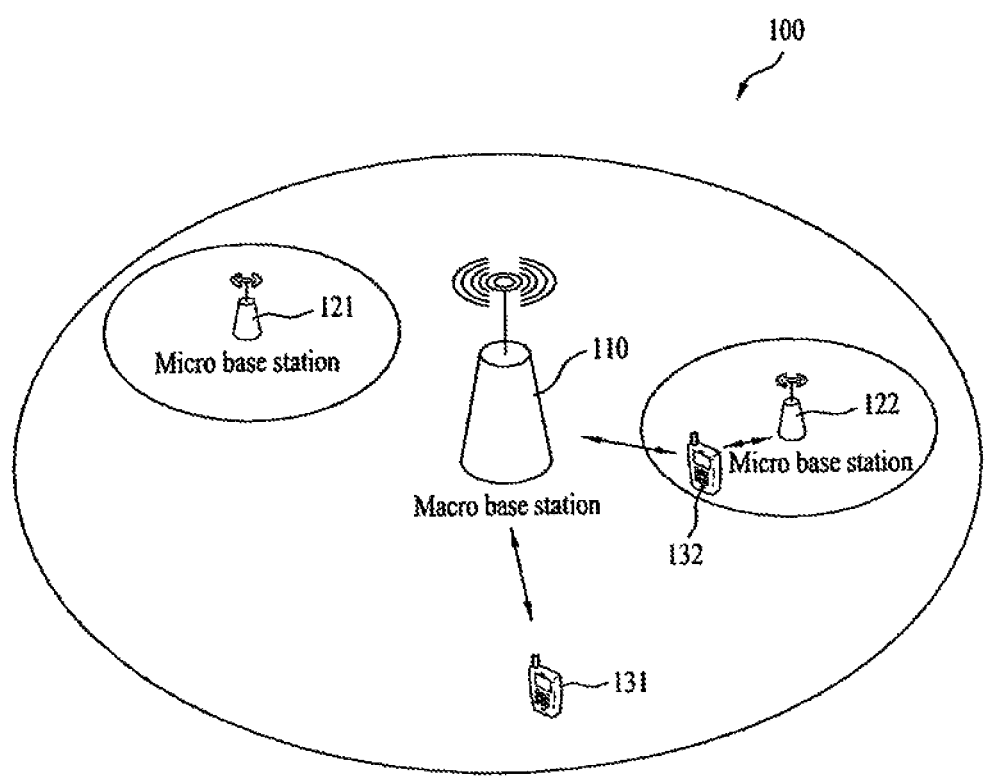
FIG. 1 shows a heterogeneous network wireless communication system.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. The CDMA may be embodied with wireless (or radio) technology such as UTRA (Universal Terrestrial Radio Access) or CDMA2000. The TDMA may be embodied with wireless (or radio) technology such as GSM (Global System for Mobile communications)/GPRS (General Packet Radio Service)/EDGE (Enhanced Data Rates for GSM Evolution). The OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The 3GPP LTE employs the OFDMA in downlink and employs the SC-FDMA in uplink. The LTE-Advanced (LTE-A) is an evolved version of the 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and 3GPP LTE-A system. However, technical features of the present invention are not limited thereto.

Figure 2:
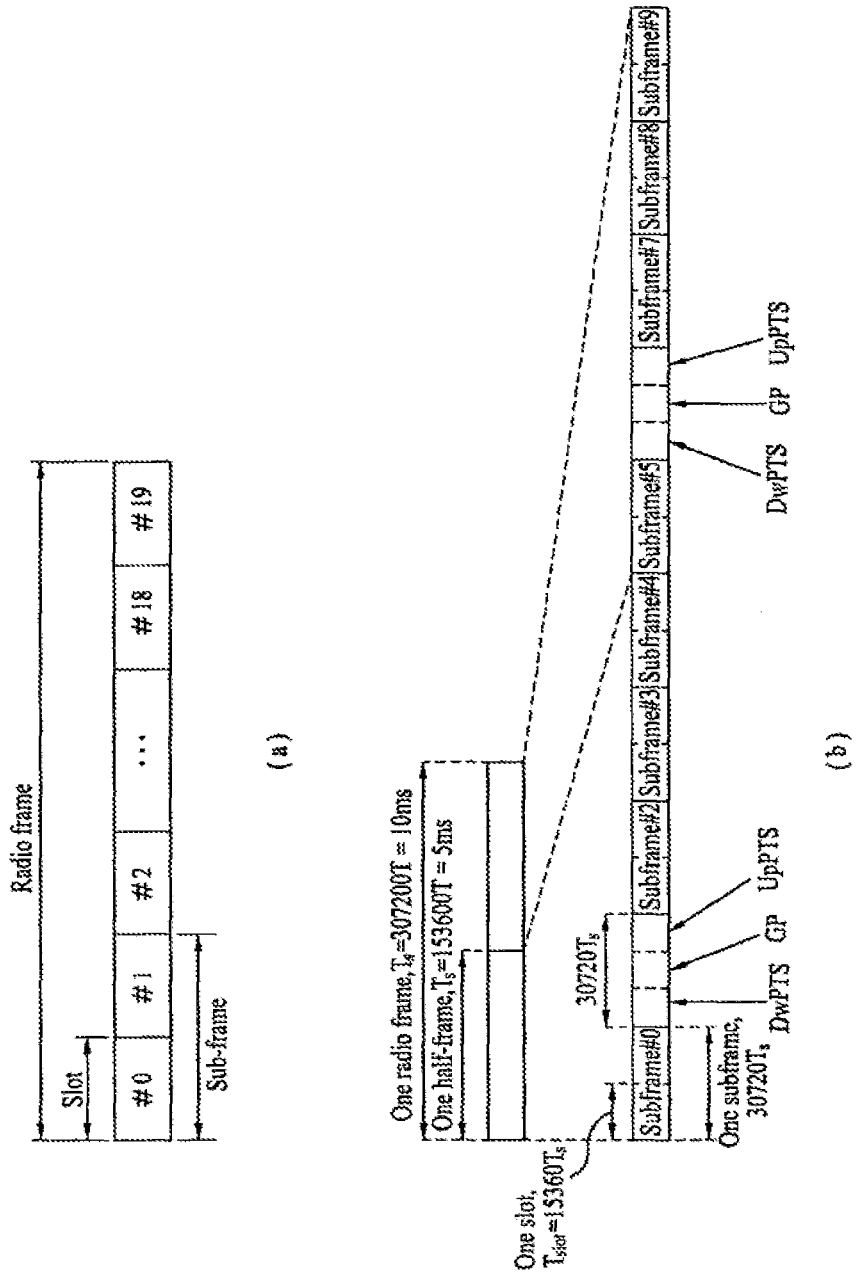
FIG. 2 shows the structure of a downlink radio frame.

The structure of a downlink radio frame will be described with reference to FIG. 2.

In a cellular Orthogonal Frequency Division Multiplexing (OFDM) radio packet communication system, uplink/downlink data packet transmission is performed in subframe units. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 2(a) is a diagram showing the structure of the type 1 radio frame. A downlink radio frame includes 10 subframes, and one subframe includes two slots in time domain. A time required for transmitting one subframe is defined in a Transmission Time Interval (TTI). For example, one subframe may have a length of 1 ms and one slot may have a length of 0.5 ms. One slot may include a plurality of OFDM symbols in time domain and include a plurality of Resource Blocks (RBs) in frequency domain. Since the 3GPP LTE system uses OFDMA in downlink, the OFDM symbol indicates one symbol duration. The OFDM symbol may be called a SC-FDMA symbol or a symbol duration. A RB is a resource allocation unit and includes a plurality of contiguous subcarriers in one slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, the number of OFDM symbols included in one slot is less than that of the case of the normal CP. In case of the extended CP, for example, the number of OFDM symbols included in one slot may be six. If a channel state is instable, for example, if a User Equipment (UE) moves at a high speed, the extended CP may be used in order to further reduce interference between symbols.

In case of using the normal CP, since one slot includes seven OFDM symbols, one subframe includes 14 OFDM symbols. At this time, the first two or three OFDM symbols of each subframe may be allocated to a Physical Downlink Control Channel (PDCCH) and the remaining OFDM symbols may be allocated to a Physical Downlink Shared Channel (PDSCH).

FIG. 2(b) is a diagram showing the structure of the type 2 radio frame. The type 2 radio frame includes two half frames, each of which includes five subframes, a downlink pilot time slot (DwPTS), a guard period (GP), and an uplink pilot time slot (UpPTS). One of these subframes includes two slots. The DwPTS is used for initial cell search, synchronization and channel estimation at a user equipment. The UpPTS is used for channel estimation and uplink transmission synchronization of the user equipment. The guard period is to remove interference occurring in an uplink due to multi-path delay of a downlink signal between the uplink and a downlink. Meanwhile, one subframe includes two slots regardless of a type of the radio frame.

The structure of the radio frame is only exemplary. Accordingly, the number of subframes included in the radio frame, the number of slots included in the subframe or the number of symbols included in the slot may be changed in various manners.

Figure 3:
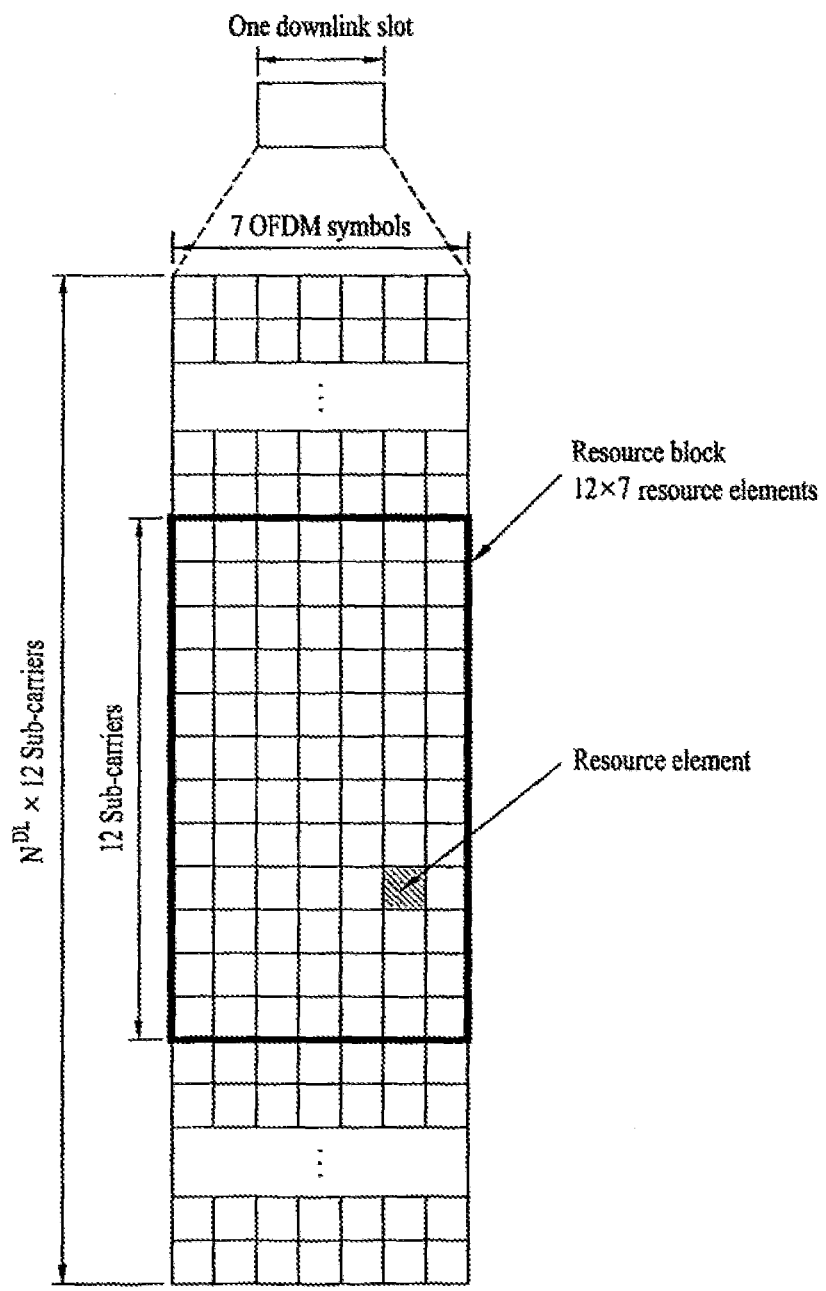
FIG. 3 shows a resource grid in a downlink slot.

FIG. 3 is a diagram showing a resource grid in a downlink slot. Although one downlink slot includes seven OFDM symbols in a time domain and one RB includes 12 subcarriers in a frequency domain in the figure, the present invention is not limited thereto. For example, in case of a normal Cyclic Prefix (CP), one slot includes 7 OFDM symbols. However, in case of an extended CP, one slot includes 6 OFDM symbols. Each element on the resource grid is referred to as a resource element. One RB includes 12×7 resource elements. The number $N^{DL}$ of RBs included in the downlink slot is determined based on a downlink transmission bandwidth. The structure of the uplink slot may be equal to the structure of the downlink slot.

Figure 4:
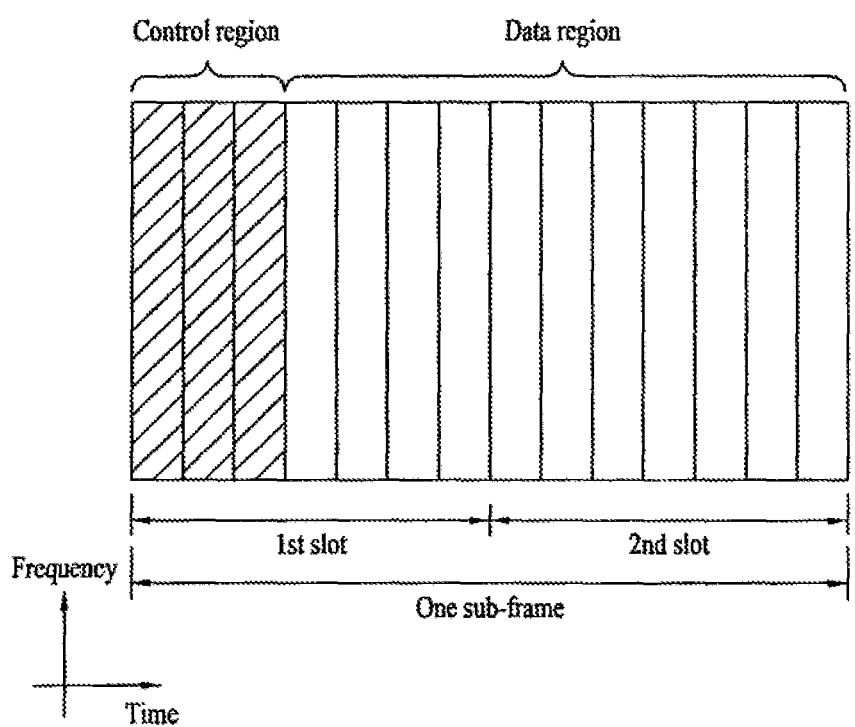
FIG. 4 shows the structure of a downlink subframe.

FIG. 4 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response of uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of an higher layer control message such as a Random Access Response (RAR) transmitted on the PDSCH, a set of transmit power control commands for an individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted on an aggregation of one or several consecutive control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The base station determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 5:
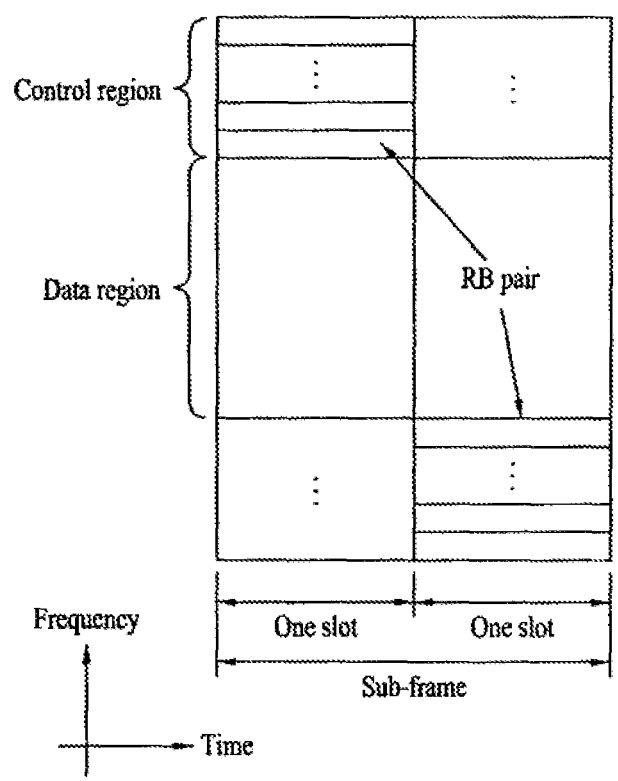
FIG. 5 shows the structure of an uplink subframe.

FIG. 5 is a diagram showing the structure of an uplink frame. The uplink subframe may be divided into a control region and a data region in a frequency domain. A Physical Uplink Control Channel (PUCCH) including uplink control information is allocated to the control region. A Physical uplink Shared Channel (PUSCH) including user data is allocated to the data region. In order to maintain single carrier property, one UE does not simultaneously transmit the PUCCH and the PUSCH. The PUCCH for one UE is allocated to a RB pair in a subframe. RBs belonging to the RB pair occupy different subcarriers with respect to two slots. Thus, the RB pair allocated to the PUCCH is "frequency-hopped" at a slot boundary.

Modeling of Multi-Input Multi-Output (MIMO) System

FIG. 6 is a diagram showing the configuration of a radio communication system having multiple antennas.

As shown in FIG. 6(a), if the number of transmission antennas is increased to $N_T$ and the number of reception antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate $R_0$ upon using a single antenna and a rate increase ratio $R_i$.

$$R_i = \min(N_T, N_R) \quad \text{Equation 1}$$

For example, in an MIMO system using four transmission antennas and four reception antennas, it is possible to theoretically acquire a transfer rate which is four times that of a single antenna system. After the increase in the theoretical capacity of the MIMO system was proved in the mid-1990 s, various technologies of substantially improving a data transfer rate have been actively developed up to now. In addition, several technologies are already applied to the various radio communication standards such as the third-generation mobile communication and the next-generation wireless local area network (LAN).

According to the researches into the MEMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

The communication method of the MIMO system will be described in more detail using mathematical modeling. In the above system, it is assumed that $N_T$ transmission antennas and $N_R$ reception antennas are present.

In transmitted signals, if the $N_T$ transmission antennas are present, the number of pieces of maximally transmittable information is $N_T$. The transmitted information may be expressed as follows.

$$s = [s_1, s_2, \ldots, s_{N_T}]^T \quad \text{Equation 2}$$

The transmitted information $s_1, s_2, \ldots, s_{N_T}$ may have different transmit powers. If the respective transmit powers are $P_1, P^2, \ldots, P_{N_T}$, the transmitted information with adjusted powers may be expressed as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{Equation 3}$$

In addition, $\hat{S}$ may be expressed using a diagonal matrix $P$ of the transmit powers as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{Equation 4}$$

Consider that the $N_T$ actually transmitted signals $x_1, x_2, \ldots, x_{N_T}$ are configured by applying a weight matrix W to the information vector $\hat{S}$ with the adjusted transmit powers. The weight matrix W serves to appropriately distribute the transmitted information to each antenna according to a transport channel state, etc. $x_1, x_2, \ldots, x_{N_T}$ may be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{Equation 5}$$

where, $W_{ij}$ denotes a weight between an i-th transmission antenna and j-th information. W is also called a precoding matrix.

In received signals, if the $N_R$ reception antennas are present, respective received signals $y_1, y_2, \ldots, y_{N_R}$ of the antennas are expressed as follows.

$$y = [y_1, y_2, \ldots, y_{N_R}]^T \quad \text{Equation 6}$$

If channels are modeled in the MIMO radio communication system, the channels may be distinguished according to transmission/reception antenna indexes. A channel from the transmission antenna j to the reception antenna i is denoted by $h_{ij}$. In $h_{ij}$, it is noted that the indexes of the reception antennas precede the indexes of the transmission antennas in view of the order of indexes.

FIG. 6(*b*) is a diagram showing channels from the $N_T$ transmission antennas to the reception antenna i. The channels may be combined and expressed in the form of a vector and a matrix. In FIG. 6(*b*), the channels from the $N_T$ transmission antennas to the reception antenna i may be expressed as follows.

$$h_i^T = [h_{i1}, h_{i2}, \ldots, h_{iN_T}] \quad \text{Equation 7}$$

Accordingly, all the channels from the $N_T$ transmission antennas to the $N_R$ reception antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{Equation 8}$$

An Additive White Gaussian Noise (AWGN) is added to the actual channels after a channel matrix H. The AWGN $n_1, n_2, \ldots, n_{N_R}$ added to the $N_T$ transmission antennas may be expressed as follows.

$$n = [n_1, n_2, \ldots, n_{N_R}]^T \quad \text{Equation 9}$$

Through the above-described mathematical modeling, the received signals may be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_T 1} & h_{N_T 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{Equation 10}$$

$$Hx + n$$

The number of rows and columns of the channel matrix H indicating the channel state is determined by the number of transmission and reception antennas. The number of rows of the channel matrix H is equal to the number $N_R$ of reception antennas and the number of columns thereof is equal to the number $N_T$ of transmission antennas. That is, the channel matrix H is an $N_R \times N_T$ matrix.

The rank of the matrix is defined by the smaller of the number of rows or columns, which is independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{Equation 11}$$

When the matrix is subjected to Eigen value decomposition, the rank may be defined by the number of Eigen values excluding 0. Similarly, when the matrix is subjected to singular value decomposition, the rank may be defined by the number of singular values excluding 0. Accordingly, the physical meaning of the rank in the channel matrix may be a maximum number of different transmittable information in a given channel.

Reference Signal (RS)

In a radio communication system, since packets are transmitted through a radio channel, a signal may be distorted during transmission. In order to enable a reception side to correctly receive the distorted signal, distortion of the received signal should be corrected using channel information. In order to detect the channel information, a method of transmitting a signal, of which both the transmission side and the reception side are aware, and detecting channel information using a distortion degree when the signal is received through a channel is mainly used. The above signal is referred to as a pilot signal or a reference signal (RS).

When transmitting and receiving data using multiple antennas, the channel states between the transmission antennas and the reception antennas should be detected in order to correctly receive the signal. Accordingly, each transmission antenna has an individual RS.

A downlink RS includes a Common RS (CRS) shared among all UEs in a cell and a Dedicated RS (DRS) for only a specific-UE. It is possible to provide information for channel estimation and demodulation using such RSs.

The reception side (UE) estimates the channel state from the CRS and feeds back an indicator associated with channel quality, such as a Channel Quality Indicator (CQI), a Precoding Matrix Index (PMI) and/or a Rank Indicator (RI), to the transmission side (eNodeB). The CRS may be also called a cell-specific RS. Alternatively, an RS associated with the feedback of Channel State Information (CSI) such as CQI/PMI/RI may be separately defined as a CSI-RS.

The DRS may be transmitted through REs if data demodulation on a PDSCH is necessary. The UE may receive the presence/absence of the DRS from a higher layer and receive information indicating that the DRS is valid only when the PDSCH is mapped. The DRS may be also called a UE-specific RS or a Demodulation RS (DMRS).

FIG. 7 is a diagram showing a pattern of CRSs and DRSs mapped on a downlink RB defined in the existing 3GPP LTE system (e.g., Release-8). The downlink RB as a mapping unit of the RSs may be expressed in units of one subframe on a time domain×12 subcarriers on a frequency domain. That is, on the time axis, one RB has a length of 14 OFDM symbols in case of the normal CP (FIG. 7(a)) and has a length of 12 OFDM symbols in case of the extended CP (FIG. 7(b)).

FIG. 7 shows the locations of the RSs on the RB in the system in which the eNodeB supports four transmission antennas. In FIG. 7, Resource Elements (REs) denoted by "0", "1", "2" and "3" indicate the locations of the CRSs of the antenna port indexes 0, 1, 2 and 3, respectively. In FIG. 7, the RE denoted by "D" indicates the location of the DRS.

Hereinafter, the CRS will be described in detail.

The CRS is used to estimate the channel of a physical antenna and is distributed over the entire band as an RS which is able to be commonly received by all UEs located within a cell. The CRS may be used for CSI acquisition and data demodulation.

The CRS is defined in various formats according to the antenna configuration of the transmission side (eNodeB). The 3GPP LTE (e.g., Release-8) system supports various antenna configurations, and a downlink signal transmission side (eNodeB) has three antenna configurations such as a single antenna, two transmission antennas and four transmission antennas. If the eNodeB performs single-antenna transmission, RSs for a single antenna port are arranged. If the eNodeB performs two-antenna transmission, RSs for two antenna ports are arranged using a Time Division Multiplexing (TDM) and/or Frequency Division Multiplexing (FDM) scheme. That is, the RSs for the two antenna ports are arranged in different time resources and/or different frequency resources so as to be distinguished from each other. In addition, if the eNodeB performs four-antenna transmission, RSs for four antenna ports are arranged using the TDM/FDM scheme. The channel information estimated by the downlink signal reception side (UE) through the CRSs may be used to demodulate data transmitted using a transmission scheme such as single antenna transmission, transmit diversity, closed-loop spatial multiplexing, open-loop spatial multiplexing, or Multi-User MIMO (MU-MIMO).

If multiple antennas are supported, when RSs are transmitted from a certain antenna port, the RSs are transmitted at the locations of the REs specified according to the RS pattern and any signal is not transmitted at the locations of the REs specified for another antenna port.

The rule of mapping the CRSs to the RBs is defined by Equation 12.

$$k = 6m + (v + v_{shift}) \bmod 6 \quad \text{Equation 12}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 12, k denotes a subcarrier index, l denotes a symbol index, and p denotes an antenna port index. $N_{symb}^{DL}$ denotes the number of OFDM symbols of one downlink slot, $N_{RB}^{DL}$ denotes the number of RBs allocated to the downlink, $n_s$ denotes a slot index, and $N_{ID}^{cell}$ denotes a cell ID. mod indicates a modulo operation. The location of the RS in the frequency domain depends on a value $V_{shift}$. Since the value $V_{shift}$ depends on the cell ID, the location of the RS has a frequency shift value which varies according to the cell.

In detail, in order to increase channel estimation performance through the CRSs, the locations of the CRSs in the frequency domain may be shifted so as to be changed according to the cells. For example, if the RSs are located at an interval of three subcarriers, the RSs are arranged on 3k-th subcarriers in one cell and arranged on (3k+1)-th subcarriers in the other cell. In view of one antenna port, the RSs are arranged at an interval of 6 REs (that is, interval of 6 subcarriers) in the frequency domain and are separated from REs, on which RSs allocated to another antenna port are arranged, by 3 REs in the frequency domain.

In addition, power boosting is applied to the CRSs. The power boosting indicates that the RSs are transmitted using higher power by bringing (stealing) the powers of the REs except for the REs allocated for the RSs among the REs of one OFDM symbol.

In the time domain, the RSs are arranged from a symbol index (l=0) of each slot as a starting point at a constant interval. The time interval is differently defined according to the CP length. The RSs are located on symbol indexes 0 and 4 of the slot in case of the normal CP and are located on symbol indexes 0 and 3 of the slot in case of the extended CP. Only RSs for a maximum of two antenna ports are defined in one OFDM symbol. Accordingly, upon four-transmission antenna transmission, the RSs for the antenna ports 0 and 1 are located on the symbol indexes 0 and 4 (the symbol indexes 0 and 3 in case of the extended CP) of the slot and the RSs for the antenna ports 2 and 3 are located on the symbol index 1 of the slot. The frequency locations of the RSs for the antenna ports 2 and 3 in the frequency domain are exchanged with each other in a second slot.

In order to support spectrum efficiency higher than that of the existing 3GPP LTE (e.g., Release-8) system, a system (e.g., an LTE-A system) having the extended antenna configuration may be designed. The extended antenna configuration may have, for example, eight transmission antennas. In the system having the extended antenna configuration, UEs which operate in the existing antenna configuration needs to be supported, that is, backward compatibility needs to be supported. Accordingly, it is necessary to support a RS pattern according to the existing antenna configuration and to design a new RS pattern for an additional antenna configuration. If CRSs for the new antenna ports are added to the system having the existing antenna configuration, RS overhead is rapidly increased and thus data transfer rate is reduced. In consideration of these problems, in an LTE-A (Advanced) system which is an evolution version of the 3GPP LTE system, separate RSs (CSI-RSs) for measuring the CSI for the new antenna ports may be used.

Hereinafter, the DRS will be described in detail.

The DRS (or the UE-specific RS) is used to demodulate data. A precoding weight used for a specific UE upon multi-antenna transmission is also used in an RS without change so as to estimate an equivalent channel, in which a transfer channel and the precoding weight transmitted from each transmission antenna are combined, when the UE receives the RSs.

The existing 3GPP LTE system (e.g., Release-8) supports four-transmission antenna transmission as a maximum and the DRS for Rank 1 beamforming is defined. The DRS for Rank 1 beamforming is also denoted by the RS for the antenna port index 5. The rule of the DRS mapped on the RBs is defined by Equations 13 and 14. Equation 13 is for the normal CP and Equation 14 is for the extended CP.

$$k = (k') \bmod N_{sc}^{RB} + N_{sc}^{RB} \cdot n_{PRB} \quad \text{Equation 13}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{Equation 14}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 13 and 14, k denotes a subcarrier index, l denotes a symbol index, and p denotes an antenna port index. $N_{SC}^{RB}$ denotes the resource block size in the frequency domain and is expressed by the number of subcarriers. $n_{PRB}$ denotes a physical resource block number. $N_{RB}^{PDSCH}$ denotes the bandwidth of the RB of the PDSCH transmission. $n_s$ denotes a slot index, and $N_{ID}^{cell}$ denotes a cell ID. Mod indicates a modulo operation. The location of the RS in the frequency domain depends on a value $V_{shift}$. Since the value $V_{shift}$ depends on the cell ID, the location of the RS has a frequency shift value which varies according to the cell.

In the LTE-A system which is the evolution version of the 3GPP LTE system, high-order MIMO, multi-cell transmission, evolved MU-MIMO or the like is considered. In order to support efficient RS management and a developed transmission scheme, DRS-based data demodulation is considered. That is, separately from the DRS (antenna port index 5) for Rank 1 beamforming defined in the existing 3GPP LTE (e.g., Release-8) system, DRSs for two or more layers may be defined in order to support data transmission through the added antenna.

Cooperative Multi-Point (CoMP)

According to the improved system performance requirements of the 3GPP LTE-A system, CoMP transmission/reception technology (may be referred to as co-MIMO, collaborative MIMO or network MIMO) is proposed. The CoMP technology can increase the performance of the UE located on a cell edge and increase average sector throughput.

In general, in a multi-cell environment in which a frequency reuse factor is 1, the performance of the UE located on the cell edge and average sector throughput may be reduced due to Inter-Cell Interference (ICI). In order to reduce the ICI, in the existing LTE system, a method of enabling the UE located on the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

The CoMP scheme applicable to the downlink may be largely classified into a Joint Processing (JP) scheme and a Coordinated Scheduling/Beamforming (CS/CB) scheme.

In the JP scheme, each point (eNodeB) of a CoMP unit may use data. The CoMP unit refers to a set of eNodeBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by the coordination of the cells of the CoMP unit.

In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

Sounding RS (SRS)

An SRS is used for enabling an eNodeB to measure channel quality so as to perform frequency-selective scheduling on the uplink and is not associated with uplink data and/or control information transmission. However, the present invention is not limited thereto and the SRS may be used for improved power control or supporting of various start-up functions of UEs which are not recently scheduled. Examples of the start-up functions may include, for example, initial Modulation and Coding Scheme (MCS), initial power control for data transmission, timing advance, and frequency-semi-selective scheduling (scheduling for selectively allocating frequency resources in a first slot of a subframe and pseudo-randomly hopping to another frequency in a second slot).

In addition, the SRS may be used for downlink channel quality measurement on the assumption that the radio channel is reciprocal between the uplink and downlink. This assumption is particularly valid in a Time Division Duplex (TDD) system in which the same frequency band is shared between the uplink and the downlink and is divided in the time domain.

The subframe through which the SRS is transmitted by a certain UE within the cell is indicated by cell-specific broadcast signaling. 4-bit cell-specific "srsSubframeConfiguration" parameter indicates 15 possible configurations of the subframe through which the SRS can be transmitted within each radio frame. By such configurations, it is possible to provide adjustment flexibility of SRS overhead according to a network arrangement scenario. The remaining one (sixteenth) configuration of the parameters indicates the switch-off of the SRS transmission within the cell and is suitable for a serving cell for serving high-rate UEs.

Figure 8:
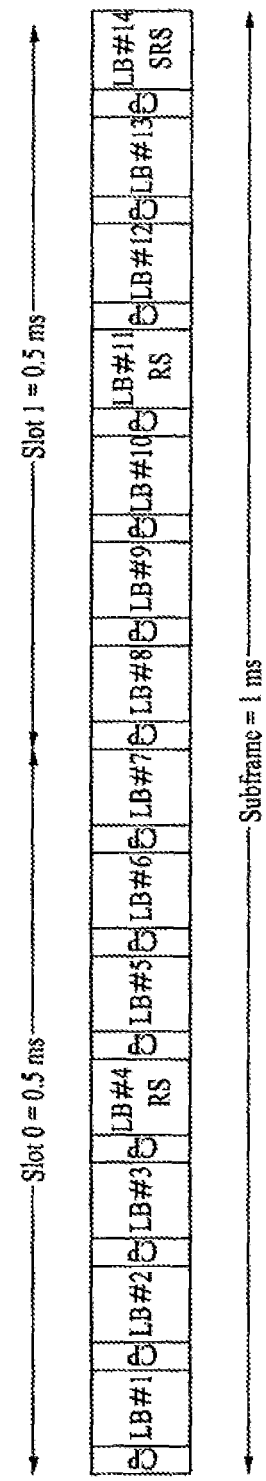
FIG. 8 shows the structure of an uplink subframe including an SRS symbol.

As shown in FIG. 8, the SRS is always transmitted on a last SC-FDMA symbol of the configured subframe. Accordingly, the SRS and a Demodulation RS (DMRS) are located on different SC-FDMA symbols. PUSCH data transmission is not allowed on the SC-FDMA symbol specified for SRS transmission and thus sounding overhead does not approximately exceed 7% even when it is highest (that is, even when SRS transmission symbols are present in all subframes).

Each SRS symbol is generated by the basic sequence (random sequence or Zadoff-Ch (ZC)-based sequence set) with respect to a given time unit and frequency band, and all UEs within the cell use the same basic sequence. At this time, the SRS transmission of the plurality of UEs within the cell in the same time unit and the same frequency band is orthogonally distinguished by different cyclic shifts of the base sequence allocated to the plurality of UEs. The SRS sequences of different cells can be distinguished by allocating different basic sequences to respective cells, but the orthogonality between the different basic sequences is not guaranteed.

Relay Node (RN)

A RN may be considered for, for example, enlargement of high data rate coverage, improvement of group mobility, temporary network deployment, improvement of cell edge throughput and/or provision of network coverage to a new area.

A RN forwards data transmitted or received between the eNodeB and the UE, two different links (backhaul link and access link) are applied to the respective carrier frequency bands having different attributes. The eNodeB may include a donor cell. The RN is wirelessly connected to a radio access network through the donor cell.

The backhaul link between the eNodeB and the RN may be represented by a backhaul downlink if downlink frequency bands or downlink subframe resources are used, and may be represented by a backhaul uplink if uplink frequency bands or uplink subframe resources are used. Here, the frequency band is resource allocated in a Frequency Division Duplex (FDD) mode and the subframe is resource allocated in a Time Division Duplex (TDD) mode. Similarly, the access link between the RN and the UE(s) may be represented by an access downlink if downlink frequency bands or downlink subframe resources are used, and may be represented by an access uplink if uplink frequency bands or uplink subframe resources are used.

The eNodeB must have functions such as uplink reception and downlink transmission and the UE must have functions such as uplink transmission and downlink reception. The RN must have all functions such as backhaul uplink transmission to the eNodeB, access uplink reception from the UE, the backhaul downlink reception from the eNodeB and access downlink transmission to the UE.

Figure 9:
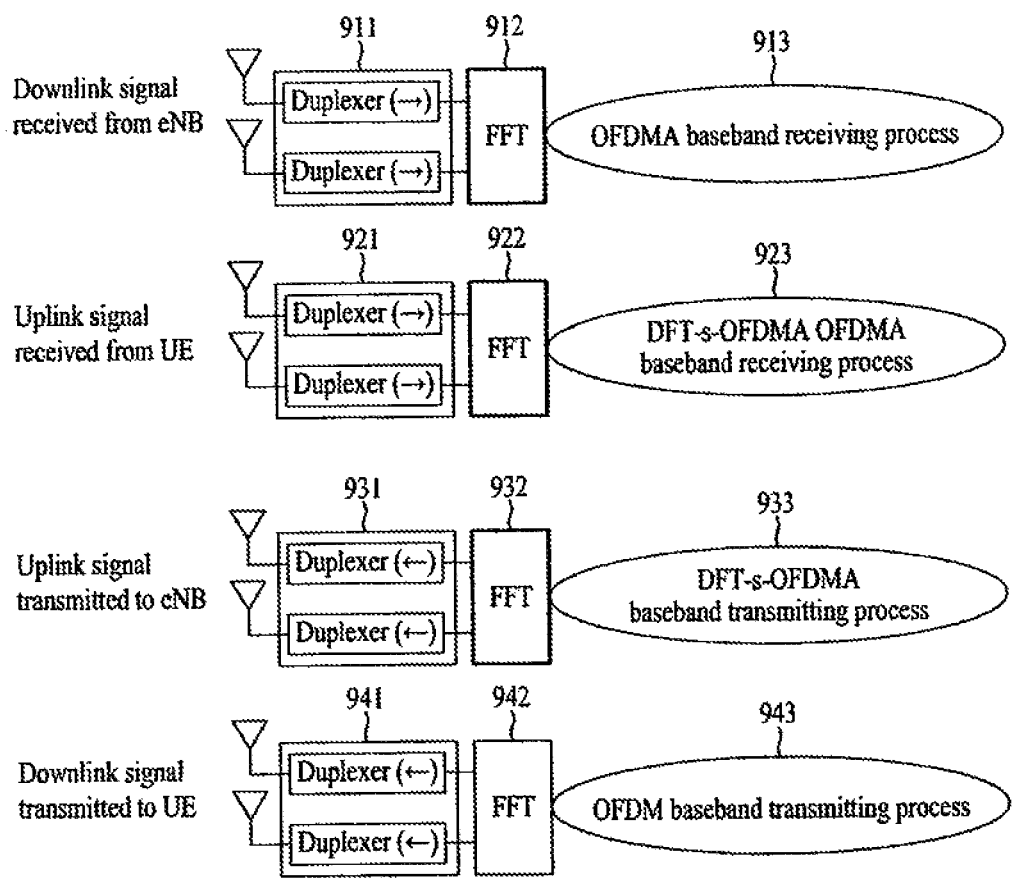
FIG. 9 shows an example of implementing transmission and reception functions of an FDD-mode RN.

FIG. 9 is a diagram showing an example of implementing transmission and reception functions of a FDD-mode RN. The reception function of the RN will now be conceptually described. A downlink signal received from the eNodeB is forwarded to a Fast Fourier Transform (FFT) module 912 through a duplexer 911 and is subjected to an OFDMA baseband reception process 913. An uplink signal received from the UE is forwarded to a FFT module 922 through a duplexer 921 and is subjected to a Discrete Fourier Transform-spread-OFDMA (DFT-s-OFDMA) baseband reception process 923. The process of receiving the downlink signal from the eNodeB and the process of receiving the uplink signal from the UE may be simultaneously performed. The transmission function of the RN will now be described. The uplink signal transmitted to the eNodeB is transmitted through a DFT-s-OFDMA baseband transmission process 933, an Inverse FFT (IFFT) module 932 and a duplexer 931. The downlink signal transmitted to the UE is transmitted through an OFDM baseband transmission process 943, an IFFT module 942 and a duplexer 941. The process of transmitting the uplink signal to the eNodeB and the process of transmitting the downlink signal to the UE may be simultaneously performed. In addition, the duplexers shown as functioning in one direction may be implemented by one bidirectional duplexer. For example, the duplexer 911 and the duplexer 931 may be implemented by one bidirectional duplexer and the duplexer 921 and the duplexer 941 may be implemented by one bidirectional duplexer. The bidirectional duplexer may branch into the IFFT module associated with the transmission and reception on a specific carrier frequency band and the baseband process module line.

In association with the use of the band (or the spectrum) of the RN, the case where the backhaul link operates in the same frequency band as the access link is referred to as "in-band" and the case where the backhaul link and the access link operate in different frequency bands is referred to as "out-band". In both the in-band case and the out-band case, a UE which operates according to the existing LTE system (e.g., Release-8), hereinafter, referred to as a legacy UE, must be able to be connected to the donor cell.

The RN may be classified into a transparent RN or a non-transparent RN depending on whether or not the UE recognizes the RN. The term "transparent" indicates that the UE cannot recognize whether communication with the network is performed through the RN and the term "non-transparent" indicates that the UE recognizes whether communication with the network is performed through the RN.

In association with the control of the RN, the RN may be classified into a RN configured as a part of the donor cell or a RN for controlling the cell.

The RN configured as the part of the donor cell may have a RN ID, but does not have its cell identity. When at least a part of Radio Resource Management (RRM) of the RN is controlled by the eNodeB to which the donor cell belongs (even when the remaining parts of the RRM are located on the RN), the RN is configured as the part of the donor cell. Preferably, such an RN can support a legacy UE. For example, examples of such an RN include various types of relays such as smart repeaters, decode-and-forward relays, L2 (second layer) relays and Type-2 relays.

In the RN for controlling the cell, the RN controls one or several cells, unique physical layer cell identities are provided to the cells controlled by the RN, and the same RRM mechanism may be used. From the viewpoint of the UE, there is no difference between access to the cell controlled by the RN and access to the cell controlled by a general eNodeB. Preferably, the cell controlled by such an RN may support a legacy UE. For example, examples of such an RN include self-backhauling relays, L3 (third layer) relays, Type-1 relays and Type-1a relays.

The Type-1 relay is an in-band relay for controlling a plurality of cells, which appears to be different from the donor cell, from the viewpoint of the UE. In addition, the plurality of cells has respective physical cell IDs (defined in the LTE Release-8) and the RN may transmit its synchronization channel, RSs, etc. In a single-cell operation, the UE may directly receive scheduling information and HARQ feedback from the RN and transmit its control channel (Scheduling Request (SR), CQI, ACK/NACK, etc.) to the RN. In addition, a legacy UE (a UE which operates according to the LTE Release-8 system) regards the Type-1 relay as a legacy eNodeB (an eNodeB which operates according to the LTE Release-8 system). That is, the Type-1 relay has backward compatibility. The UEs which operates according to the LTE-A system regard the Type-1 relay as an eNodeB different from the legacy eNodeB, thereby achieving performance improvement.

The Type-1a relay has the same characteristics as the above-described Type-1 relay except that it operates as an out-band relay. The Type-1a relay may be configured so as to minimize or eliminate an influence of the operation thereof on an L1 (first layer) operation.

The Type-2 relay is an in-band relay and does not have a separate physical cell ID. Thus, a new cell is not established. The Type-2 relay is transparent to the legacy UE and the legacy UE does not recognize the presence of the Type-2 relay. The Type-2 relay can transmit a PDSCH, but does not transmit at least a CRS and a PDCCH.

In order to enable the RN to operate as the in-band relay, some resources in a time-frequency space must be reserved for the backhaul link so as not to be used for the access link. This is called resource partitioning.

The general principle of the resource partitioning in the RN will now be described. The backhaul downlink and the access downlink may be multiplexed on one carrier frequency using a Time Division Multiplexing (TDM) scheme (that is, only one of the backhaul downlink or the access downlink is activated in a specific time). Similarly, the backhaul uplink and the access uplink may be multiplexed on one carrier frequency using the TDM scheme (that is, only one of the backhaul uplink or the access uplink is activated in a specific time).

The multiplexing of the backhaul link using a FDD scheme indicates that backhaul downlink transmission is performed in a downlink frequency band and the backhaul uplink transmission is performed in an uplink frequency band. The multiplexing of the backhaul link using the TDD scheme indicates that the backhaul downlink transmission is performed in a downlink subframe of the eNodeB and the RN and the backhaul uplink transmission is performed in an uplink subframe of the eNodeB and the RN.

In the in-band relay, for example, if the backhaul downlink reception from the eNodeB and the access downlink transmission to the UE are simultaneously performed in a predetermined frequency band, the signal transmitted from the transmitter of the RN may be received by the receiver of the RN and thus signal interference or RF jamming may occur in the RF front end of the RN. Similarly, if the access uplink reception from the UE and the backhaul uplink transmission to the eNodeB are simultaneously performed in a predetermined frequency band, signal interference may occur in the RF front end of the RN. Accordingly, it is difficult to implement the simultaneous transmission and reception in one frequency band at the RN unless the received signal and the transmitted signal are sufficiently separated (for example, unless the transmission antennas and the reception antennas are sufficiently separated form each other (for example, on the ground or under the ground) in terms of geographical positions).

Figure 10:
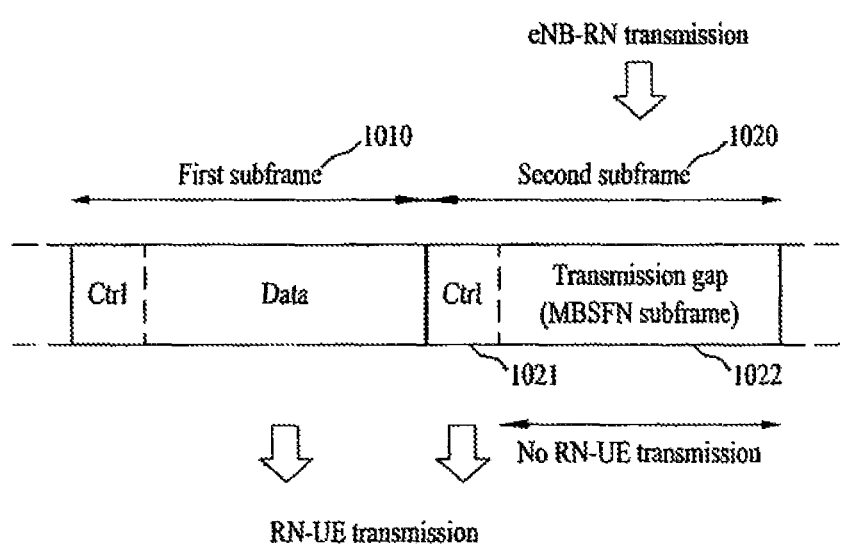
FIG. 10 shows transmission to a UE from an RN and downlink transmission to the RN from a base station.

As a method for solving the signal interference, the RN operates so as not to transmit a signal to the UE while a signal is received from the donor cell. That is, a gap may be generated in the transmission from the RN to the UE and any transmission from the RN to the UE (including the legacy UE) may not be performed. Such a gap may be set by configuring a Multicast Broadcast Single Frequency Network (MBSFN) subframe (see FIG. 10). In FIG. 10, a first subframe 1010 is a general subframe, in which a downlink (that is, access downlink) control signal and data is transmitted from the RN to the UE, and a second subframe 1020 is an MBSFN subframe, in which a control signal is transmitted from the RN to the UE in a control region 1021 of the downlink subframe, but any signal is not transmitted from the RN to the UE in the remaining region 1022 of the downlink subframe. Since the legacy UE expects the transmission of the PDCCH in all downlink subframes (that is, the RN needs to enable the legacy UEs within its own area to receive the PDCCH in every subframe so as to perform a measurement function), for the correct operation of the legacy UEs, it is necessary to transmit the PDCCH in all the downlink subframes. Accordingly, even on the subframe (the second subframe 1020)) set for the transmission of the downlink (that is, the backhaul downlink) from the eNodeB to the RN, the RN needs to transmit the access downlink in first N (N=1, 2 or 3) OFDM symbol intervals of the subframe, without receiving the backhaul downlink. Since the PDCCH is transmitted from the RN to the UE in the control region 1021 of the second subframe, it is possible to provide backward compatibility to the legacy UE served by the RN. While any signal is not transmitted from the RN to the UE in the remaining region 1022 of the second subframe, the RN may receive the signal transmitted from the eNodeB. Accordingly, the resource partitioning disables the in-band RN to simultaneously perform the access downlink transmission and the backhaul downlink reception.

The second subframe 1022 using the MBSFN subframe will now be described in detail. The control region 1021 of the second subframe may be a RN non-hearing interval. The RN non-hearing interval refers to an interval in which the RN does not receive a backhaul downlink signal and transmits an access downlink signal. This interval may be set to 1, 2 or 3 OFDM lengths as described above. The RN performs the access downlink transmission to the UE in the RN non-hearing interval 1021 and performs the backhaul downlink reception from the eNodeB in the remaining region 1022. At this time, since the RN cannot simultaneously perform the transmission and reception in the same frequency band, it takes a certain length of time to switch the RN from the transmission mode to the reception mode. Accordingly, it is necessary to set a guard time (GT) to switch the RN from the transmission mode to the reception mode in a first portion of the backhaul downlink reception region 1022. Similarly, even when the RN receives the backhaul downlink from the eNodeB and transmits the access downlink to the UE, a guard time (GT) to switch the RN from the reception mode to the transmission mode may be set. The length of the guard time may be set to values of the time domain, for example, values of k (k≥1) time samples Ts or one or more OFDM symbol lengths. Alternatively, if the backhaul downlink subframes of the RN are consecutively set or according to a predetermined subframe timing alignment relationship, the guard time of a last portion of the subframes may not be defined or set. Such a guard time may be defined only in the frequency domain set for the transmission of the backhaul downlink subframe, in order to maintain backward compatibility (the legacy UE cannot be supported if the guard time is set in the access downlink interval). The RN can receive a PDCCH and a PDSCH from the eNodeB in the backhaul downlink reception interval 1022 except for the guard time. Such PDCCH and the PDSCH are physical channels dedicated for RN and thus may be represented by a R-PDCCH (Relay-PDCCH) and a R-PDSCH (Relay-PDSCH).

Operation for Reducing Inter-Cell Interference

Referring back to FIG. 1, if the terminal 132 is a macro-terminal (served by the macro base station 110), a signal generated from the micro base station 122 may create interference in a downlink signal to the terminal 132 from the macro base station 110. For example, if the micro base station 122 is a CSG cell (namely, a cell that is accessible only by authorized terminals) and if the terminal 132 does not belong to a CSG, then the terminal 132 is not served by the micro base station 122 and should transmit and receive signals to and from the macro base station 110 even though the terminal 132 is located within a coverage range of the micro base station 122. As a result, the terminal 132 may be subject to strong interference from the micro base station 122 upon receiving the downlink signal.

In this case, RSs (e.g., CRSs), which are used for, for example, measurement of a downlink channel state in the terminal 132, may be subject to strong interference and thus strength of a downlink reception signal, for example, a Signal-to-Interference plus Noise Ratio (SINK) may be lowered to a prescribed level or less. Then, the terminal 132 recognizes a current state as Radio Link Failure (RLF) and may perform an operation for connection re-establishment to another base station. That is, if data of the base station 122 is transmitted to REs for RS transmission transmitted from the macro base station 110 to the terminal 132, strong interference may occur in the RSs received by the terminal 132. To reduce such ICI, it is possible not to interfere with RSs of a cell which is subject to interference, in downlink transmission of a cell producing interference.

According to the present invention, when a base station, which subjects a specific UE to strong interference, transmits a downlink signal (PDCCH and/or PDSCH), all or some of RE locations to which RSs (e.g., CRSs) measured by the specific terminal are transmitted may be punctured so as not to interfere with the corresponding RSs. For example, referring back to FIG. 1, upon transmitting a PDCCH and/or a PDSCH, the micro base station 122 may operate to transmit no signals in REs overlapping with REs where CRSs of the macro base station 110 are transmitted.

In the present invention, RE locations for CRS transmission between cells interfering with each other, that is, between cells which are targets of Inter-Cell Interference Coordination (ICIC) may be set not to overlap. For instance, proper frequency offset (V-shift) may be applied so that a CRS transmission RE of the macro base station 110 does not overlap with a CRS transmission RE of the base station 122. Namely, a CRS transmission RE of one base station may be set not to overlap with a CRS transmission RE of another base station.

In addition, even when RSs (e.g., CRSs) of the micro base station 122 are transmitted to data transmission REs transmitted from the macro base station 110 to the terminal 132, ICI may occur. Since the RSs are generally transmitted at a high transmission power (namely, in a power boosted state), the RSs may create strong interference in data transmission of other cells. To reduce such ICI, in downlink transmission of a cell which is subject to interference, data may not be transmitted in RS transmission locations of a cell which creates interference. More specifically, since a terminal (especially, a legacy terminal) served by a cell which creates interference expects that a serving cell thereof (i.e., the cell which creates interference) always transmits CRSs, the serving cell cannot help transmitting the CRSs even though CRSs of a cell create interference in data transmission of another cell. Accordingly, non-transmission of data in a CRS transmission RE of a cell which creates interference by a cell which is subject to interference may be considered.

According to the present invention, when a first base station which is subject to interference from a second base station transmits a PDCCH and/or a PDSCH to a specific terminal, all or part of RE locations to which RSs (e.g., CRSs) of the second base station are transmitted are punctured so that the specific terminal may not be subject to interference by the RSs of the second base station upon transmitting control signals and/or data. For example, referring back to FIG. 1, when the macro base station 110 transmits a PDCCH and/or a PDSCH, no signals may be transmitted in REs overlapping with REs where CRSs of the micro base station 122 are transmitted.

In all exemplary embodiments of the present invention described hereinbelow, a punctured RE location may refer to an RE location which is subject to interference by another base station or an RE location which subjects a terminal associated with another base station to interference.

In addition, a base station which creates interference is referred to as an interfering cell, a terminal which is subject to interference is referred to as a victim UE, and a base station serving a terminal which is subject to interference is referred to as a victim cell. In two cells which are targets of ICIC, an interfering cell may be referred to as a coordinated cell.

Embodiment 1

According to the first embodiment, in two base stations interfering with each other, one base station may puncture all REs overlapping with CRS transmission REs of the other base station. In other words, an interfering cell in downlink transmission thereof may puncture all REs overlapping with all CRS transmission REs of a victim cell, and/or the victim cell in downlink transmission thereof may puncture all REs overlapping with all CRS transmission REs of the interfering cell. The former serves to reduce ICI in CRS measurement of a victim UE and the latter serves to reduce ICI in data demodulation of the victim UE. Puncturing all REs overlapping with CRS transmission REs of another cell indicates that a cell sets REs corresponding to all antenna ports 0 to 3 (i.e., 4 CRS antenna ports) to which CRSs of another cell are transmitted to null REs and transmits signals. In other words, REs overlapping with CRS transmission REs of another cell are muted in a downlink subframe of a cell.

Figure 11:
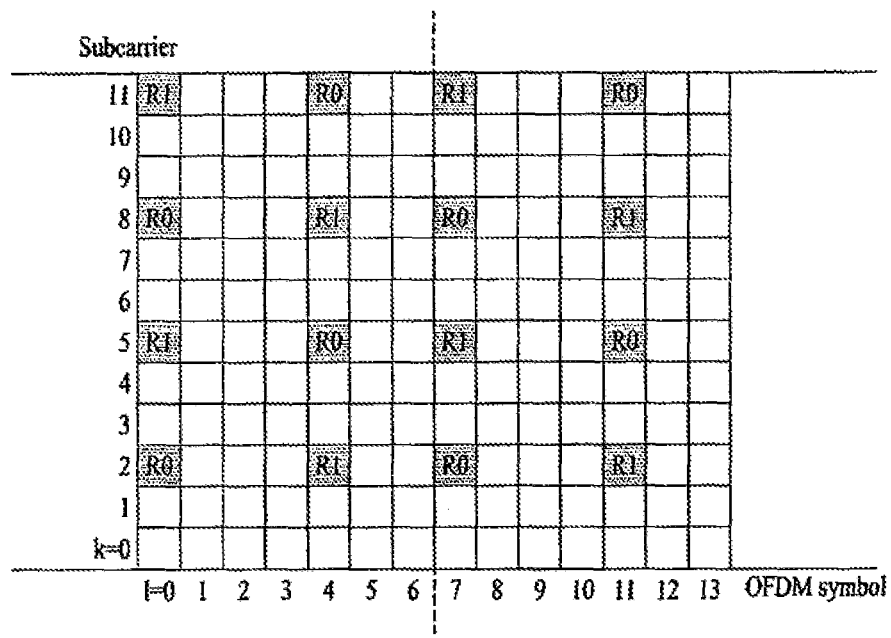
FIG. 11 shows a CRS transmission pattern of a first base station according to the present invention.
Figure 12:
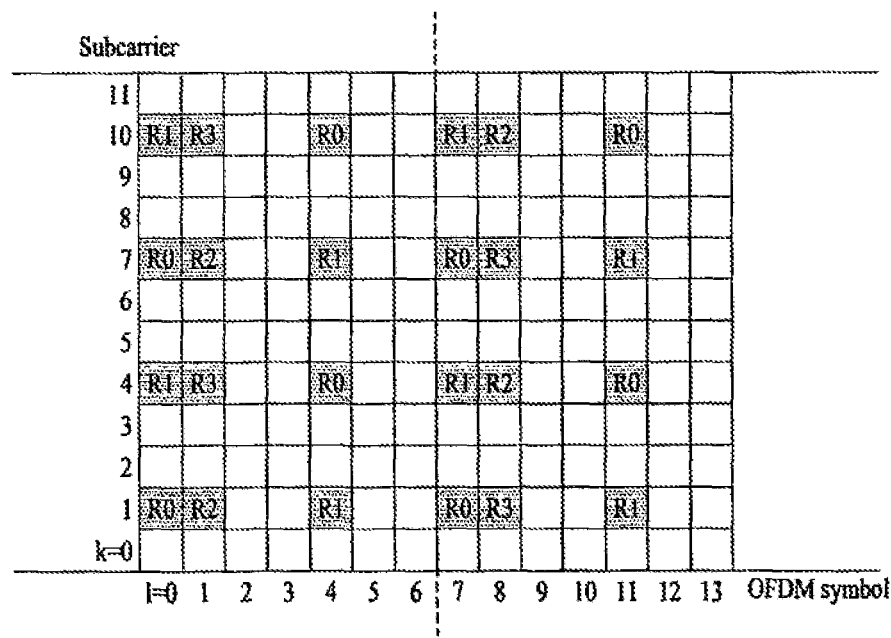
FIG. 12 shows a CRS transmission pattern of a second base station according to the present invention.
Figure 13:
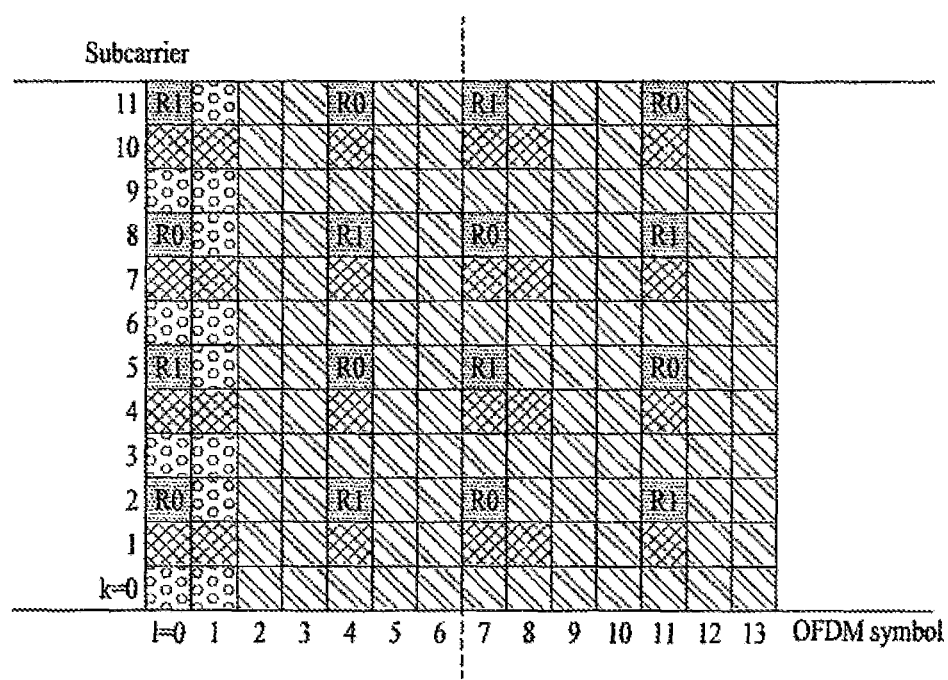
FIG. 13 shows punctured REs in a downlink subframe according to the present invention.

FIGS. 11 to 13 are diagrams explaining examples of puncturing REs according to the first embodiment of the present invention.

FIG. 11 illustrates a CRS transmission pattern (locations of REs to which CRSs are transmitted in one RB) of a first base station. It is assumed that the first base station performs transmission of 2 antenna ports for example. That is, the first base station transmits CRSs for antenna ports 0 and 1.

FIG. 12 illustrates a CRS transmission pattern of a second base station. It is assumed that the second base station performs transmission of 4 antenna ports for example. That is, the second base station transmits CRSs for antenna ports 0 to 3.

The CRS transmission patterns of FIGS. 11 and 12 show patterns shifted by an offset (V-shift) of one subcarrier.

FIG. 13 shows puncturing REs overlapping with all CRS ports of the second base station while the first base station performs downlink transmission according to an exemplary embodiment of the present invention. It is assumed in FIG. 13 that a PDCCH has a length of 2 OFDM symbols.

In a description of FIGS. 11 to 13 and exemplary embodiments of the present invention which will be described hereinbelow, the first base station may be an interfering cell and the second base station may be a victim cell, or the first base station may be a victim cell and the second base station may be an interfering cell. The former serves to prevent CRSs of the victim cell from interfering due to data transmitted by the interfering cell, and the latter serves to eliminate an effect of CRSs transmitted by the interfering cell on data transmission of the victim cell. Thus, in two base stations interfering with each other, the two methods for puncturing REs overlapping with the CRS pattern of a counterpart base station may be separately applied or may be simultaneously applied.

Embodiment 2

According to the second embodiment, in two base stations interfering with each other, one base station may puncture a part of REs overlapping with CRS transmission REs of the other base station. In other words, an interfering cell in downlink transmission thereof may puncture a part of REs overlapping with CRS transmission REs of a victim cell, and/or the victim cell in downlink transmission thereof may puncture a part of REs overlapping with CRS transmission REs of the interfering cell. The former serves to reduce ICI in CRS measurement of the victim UE and the latter serves to reduce ICI in data demodulation of the victim UE. Puncturing a part of REs overlapping with all CRS transmission REs of another cell indicates that a cell sets REs corresponding to one or more antenna ports of antenna ports 0 to 3 to which CRSs of another cell are transmitted to null REs and transmits signals. One or more antenna ports may be one of the antenna ports 0 to 3 or may be set to a combination of two or more antenna ports such as the antenna ports 0 and 2.

Figure 14:
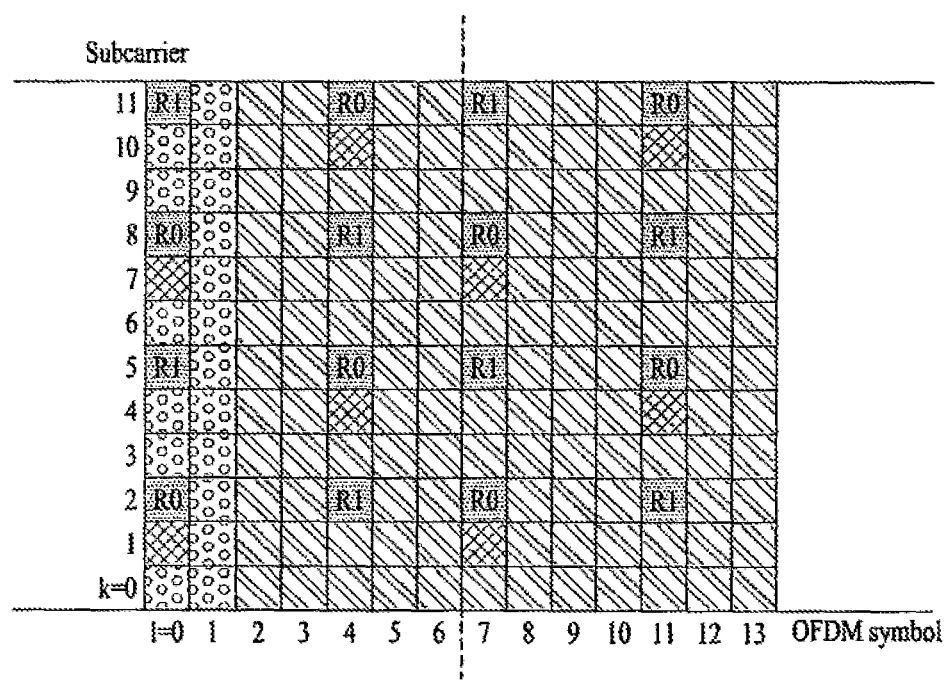
FIG. 14 shows exemplary REs punctured in a downlink frame according to the present invention.

FIG. 14 is a diagram illustrating an example of puncturing REs according to the second exemplary embodiment of the present invention.

Here, a CRS transmission pattern of a first base station assumes transmission of 2 antenna ports as in FIG. 11 and a CRS transmission pattern of a second base station assumes transmission of 4 antenna ports as in FIG. 12.

FIG. 14 shows puncturing REs overlapping with REs corresponding to an antenna port 0 among CRS transmission REs of the second base station while the first base station performs downlink transmission according to an exemplary embodiment of the present invention. It is assumed in FIG. 14 that a PDCCH has a length of 2 OFDM symbols.

In a description of FIG. 14, the first base station may be an interfering cell and the second base station may be a victim cell, or the first base station may be a victim cell and the second base station may be an interfering cell. The former serves to prevent CRSs of the victim cell from interfering due to data transmitted by the interfering cell, and the latter serves to eliminate an effect of CRSs transmitted by the interfering cell on data transmission of the victim cell. Especially, in the former case, puncturing a part of REs overlapping CRS transmission REs of another cell in downlink transmission of a cell is suitable for the case where a UE served by another cell uses only CRSs of a part of CRS antenna ports (e.g., only CRSs of the antenna port 0) upon determining RLF. Thus, in two base stations interfering with each other, the two methods for puncturing a part of REs overlapping with the CRS pattern of a counterpart base station may be separately applied or may be simultaneously applied.

While the above first and second embodiments have described puncturing REs in both a PDCCH area and a PDSCH area of a first base station when the first base station in downlink transmission thereof punctures all or some REs overlapping with the CRS pattern of a second base station in the two base stations interfering with each other, the present invention is not limited thereto. That is, in the downlink transmission of the first base station, all or some REs overlapping with the CRS pattern of the second base station may be punctured in either the PDCCH area or the PDSCH area. Alternatively, when REs overlapping with REs of some antenna ports of the CRS pattern of the second base station are punctured in downlink transmission of the first base station, the partial antenna ports may be differently set in the PDCCH area and the PDSCH area. For example, REs overlapping REs of antenna ports 0 and 1 of the CRS pattern of the second base station may be punctured in the PDCCH area of the first base station, and REs overlapping REs of the antenna port 0 of the CRS pattern of the second base station may be punctured in the PDSCH area of the first base station.

The above first and second embodiments have described the methods for puncturing REs in a base station. Hereinafter, a method for a base station to inform a UE served thereby of an RE puncturing pattern is described.

Embodiment 3

In two base stations interfering with each other, if one base station performs an operation of puncturing REs overlapping with a CRS pattern of the other base station, the corresponding base station may inform UEs connected thereto of an RE puncturing pattern through an upper layer signal or a physical layer signal. Upon receiving the signal, the UEs are able to determine the locations where RE puncturing is applied and incorporate the puncturing locations in channel decoding, thereby reducing capability degradation due to RE puncturing. For example, in the PDCCH, more PDCCH resources may be used (by applying CCE aggregation of a higher level) to reduce capability degradation, and in the PDSCH, a Modulation and Coding Scheme (MCS) may be appropriately controlled in consideration of RE puncturing.

To control a proper MCS, rate matching may be used as another method (i.e., a null RE transmission scheme) in which, in two base stations interfering with each other, one base station transmits REs overlapping a CRS pattern of another base station as null REs. Then, a base station configures a transmission signal using rate matching and UEs perform decoding according to the rate matching. In some cases, the respective UEs should decode different null RE transmission schemes. To remove uncertainty due to such cases, the base station may suitably apply RE puncturing and rate matching using UE capability information (e.g., release information) of a corresponding UE.

If an RE puncturing pattern signaling scheme and a rate matching application scheme according to RE puncturing are mixed, the base station should inform the UE which scheme is used to transmit null REs, so that the UE may perform decoding suitable for each transmission scheme.

Although the above first to third embodiments have been described under the assumption that synchronization has been established such that subframe boundaries (or timings) of two base stations interfering with each other coincide with each other, the present invention is not limited thereto. Hereinafter, exemplary embodiments applied to the case where the subframe boundaries of two base stations interfering with each other do not coincide with each other will be described.

Embodiment 4

The fourth embodiment relates to a method for reducing ICI when a subframe boundary of one of two base stations interfering with each other is shifted by a prescribed number of OFDM symbols from a subframe boundary of the other base station. For example, in two base stations interfering with each other, when any base station punctures REs overlapping a CRS pattern of the other base station in PDCCH and PDSCH areas, locations of the overlapping REs may be determined in consideration of the shifted number of OFDM symbols of a subframe boundary of one base station from a subframe boundary of the other base station. In this case, a base station performing RE puncturing informs UEs connected thereto to what extent (e.g., the number of OFDM symbols) a subframe boundary is shifted from the other base station so that the UEs may identify the locations of punctured REs. Such a shift in a subframe boundary may be used to adjust OFDM symbols where CRSs are concentrated so as to be transmitted at different times.

Figure 15:
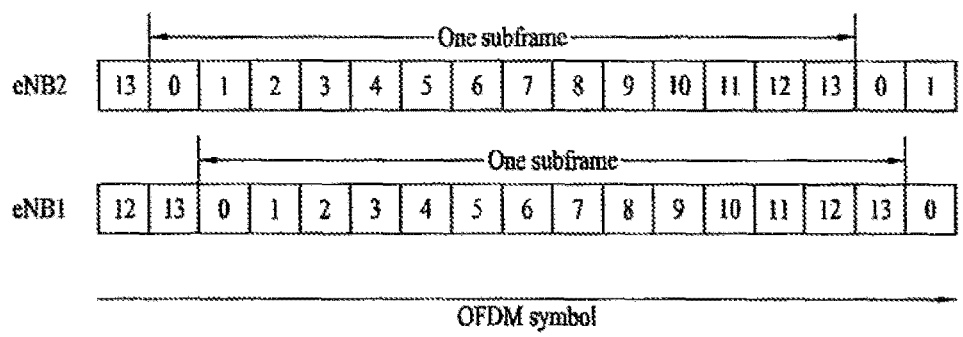
FIG. 15 shows subframes of first and second base stations having shifted boundaries according to the present invention.

In FIG. 15, a subframe boundary of a first base station (eNB1) is shifted by one OFDM symbol from a subframe boundary of a second base station (eNB2). Then, when the first base station transmits a PDCCH and/or a PDSCH, the locations of REs overlapping with a CRS pattern of the second base station, that is, the locations of punctured REs are also shifted by one OFDM symbol.

Figure 16:
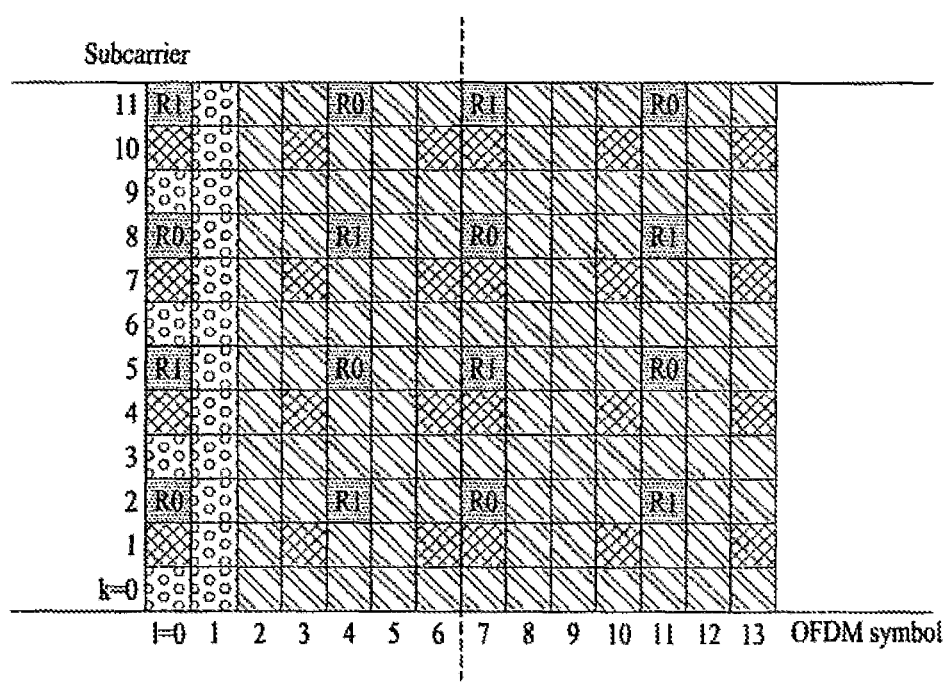
FIG. 16 shows exemplary REs punctured in a downlink subframe according to the present invention.
Figure 17:
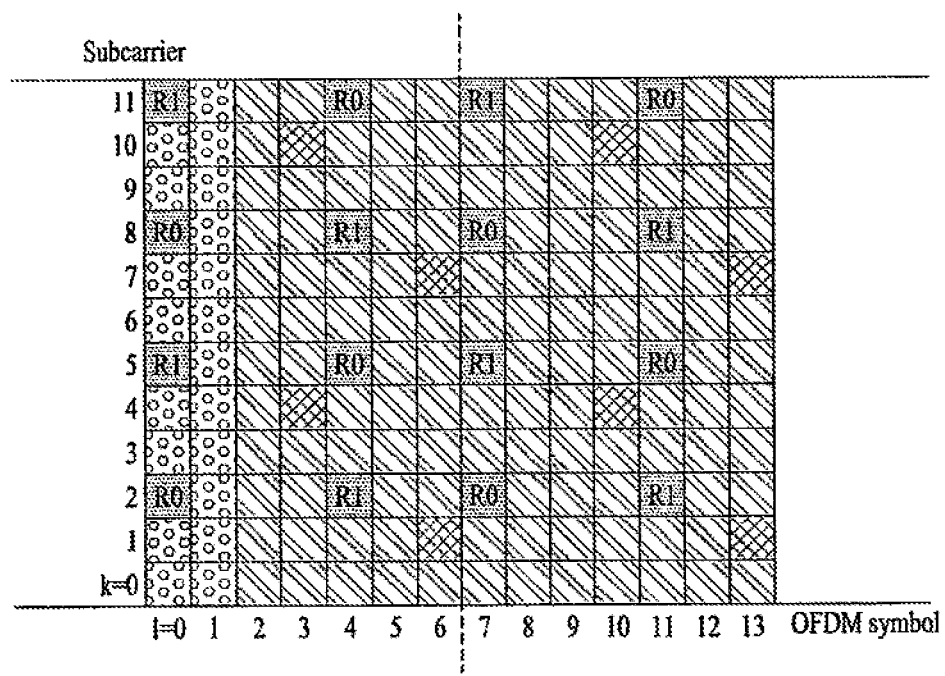
FIG. 17 shows exemplary REs punctured in a downlink subframe according to the present invention.

FIGS. 16 and 17 illustrate punctured REs in downlink transmission of a first base station, that is, REs overlapping with a CRS pattern of a second base station when a subframe boundary of the first base station is shifted by one OFDM symbol from a subframe boundary of the second base station as shown in FIG. 15. In FIGS. 16 and 17, it is assumed that CRS patterns of the first and second base stations are the same as those shown in FIGS. 11 and 12 and embodiments to which a shift in the subframe boundaries of the first and second base stations is applied are shown. FIG. 16 shows an example of puncturing all REs overlapping with the CRS pattern of the second base station in downlink transmission of the first base station. FIG. 17 shows an example of partially puncturing REs overlapping with the CRS pattern of the second base station in downlink transmission of the first base station. Namely, the examples of FIGS. 16 and 17 show the embodiments to which a shift in subframe boundaries is applied in the examples of FIGS. 13 and 14.

Embodiment 5

When subframe boundaries of two base stations do not coincide with each other as shown in FIGS. 16 and 17, that is, when any one of the subframe boundaries is shifted, a subframe boundary of one base station is within one subframe of the other base station. In FIG. 16 for example, in view of a first base station, OFDM symbols 12 and 13 are within the same subframe, but in view of a second base station, they are within different subframes. Namely, the OFDM symbols 12 and 13 in FIG. 16 correspond to an OFDM symbol 13 of one subframe and an OFDM symbol 0 of a subsequent subframe, respectively, in view of the second base station. In other words, the OFDM symbol 13 of the first base station overlaps with the OFDM symbol 0 of the second base station.

Important control information such as a PCFICH, a PHICH, and a PDCCH is conveyed in the first k OFDM symbols (e.g., OFDM symbols 0, 1, and 2) of a downlink subframe. If such important control information is subject to interference by other signals, a problem may occur in that a UE cannot receive any downlink transmission signals. Accordingly, in order to avoid interference with important downlink control information when subframe boundaries of two base stations do not coincide with each other, a first base station may not transmit a PDSCH and/or a CRS in the last k OFDM symbols of a first base station corresponding to the first k OFDM symbols of the second base station, in addition to puncturing REs overlapping with a CRS pattern of the second base station. For example, if a subframe boundary of one base station is shifted by one OFDM symbol from a subframe boundary of the other base station as shown in FIG. 15, the first base station may transmit a null RE instead of transmitting a PDSCH and/or a CRS in an OFDM symbol 13. Generally, if a subframe boundary of the first base station is shifted by k OFDM symbols, transmission may not be performed in the last k OFDM symbols in each subframe to prevent interference with a control channel of the second base station.

Figure 18:
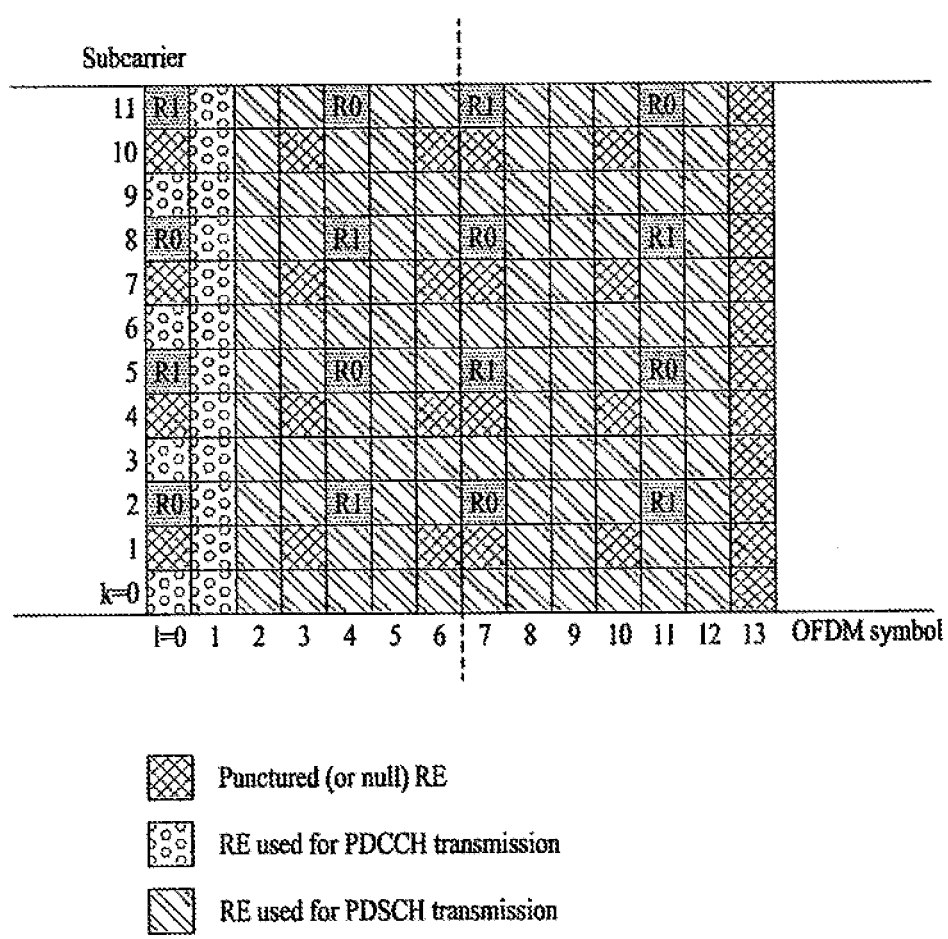
FIG. 18 shows exemplary REs punctured in a downlink subframe according to the present invention.
Figure 19:
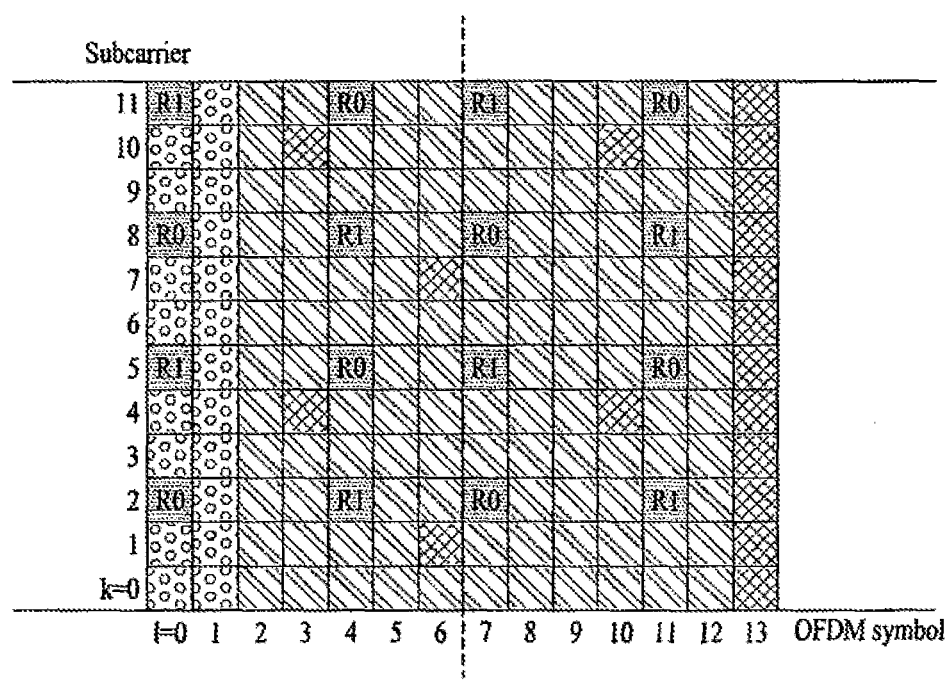
FIG. 19 shows exemplary REs punctured in a downlink subframe according to the present invention.

FIGS. 18 and 19 illustrate puncturing operations in the last OFDM symbol of a subframe of a first base station by the shifted number of OFDM symbols of a subframe boundary in the operations of FIGS. 16 and 17, respectively. In FIGS. 18 and 19, it is assumed that a subframe boundary is shifted by one OFDM symbol, and examples of puncturing the last OFDM symbol are shown in a downlink subframe of the first base station.

The first base station may transmit a signal informing a UE of information about a CRS pattern of the second base station and information about to what extent a subframe boundary is shifted. The UE then recognizes locations of punctured REs through information received from the first base station and performs channel decoding.

Upon application of the above-described first to fifth embodiments, in two base stations interfering with each other, a first base station may not puncture REs to which a PCFICH and a PHICH thereof are transmitted when puncturing REs overlapping with CRSs and/or important control information of a second base station during downlink transmission thereof. That is, REs to which the PCFICH and the PHICH of the first base station are transmitted may be transmitted without puncturing even though they overlap with the CRSs and/or important downlink control information of the second base station. This is because waste of resources generated is very significant when the PCFICH and the PHICH are not transmitted or when the UE fails to decode the PCFICH and the PHICH, whereas resources occupied by the PCFICH and the PHICH are not great. However, the REs to which the PCFICH and the PHICH of the first base station are transmitted are not excluded from being punctured in the same way as in REs applied to the PDCCH.

Embodiment 6

Figure 20:
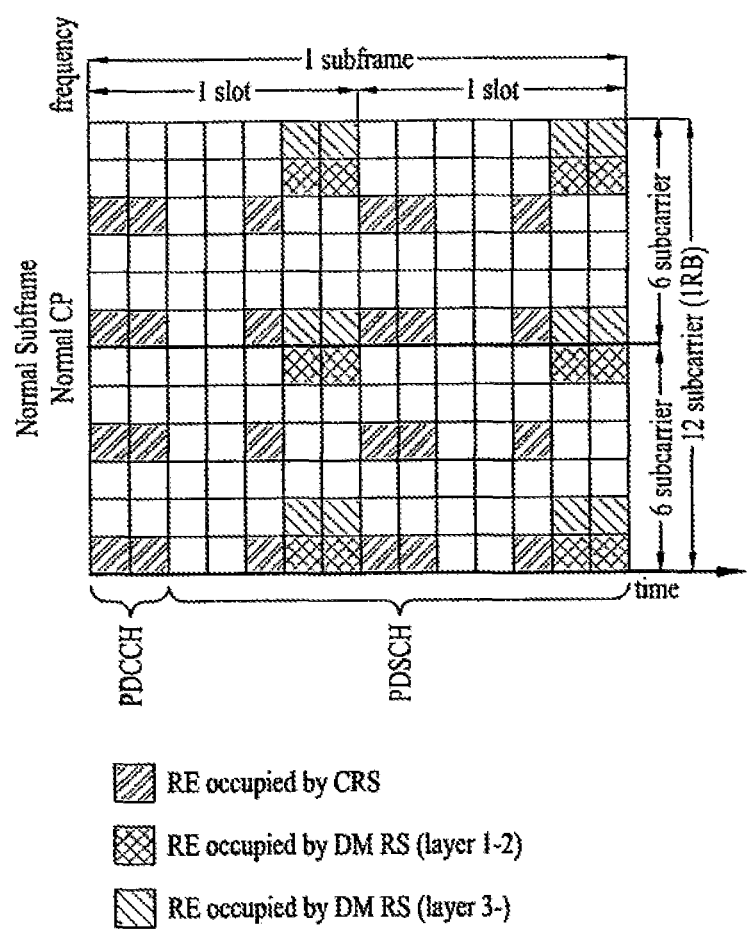
FIG. 20 shows a DMRS pattern for a normal subframe.

In an LTE-A system, DMRS based data demodulation is considered as described previously. A DMRS for two or more layers is defined according to the configuration of an extended antenna supported in the LTE-A system. A DMRS pattern may be designed as shown in FIGS. 20 and 21. FIG. 20 illustrates REs for DMRS transmission in a normal subframe of a normal CP. FIG. 21 illustrates REs for DMRS transmission which are designed for use in a DwPTS in a special subframe in the type 2 radio frame (FIG. 2(b)) applied to TDD. A length of the DwPTS in the special subframe of a TDD type frame structure is different from that in a normal subframe. For example, the DwPTS may have a length of 3, 9, 10, 11, or 12 OFDM symbols in case of a normal CP. Since no data is transmitted when a length of the DwPTS is 3 OFDM symbols, DMRSs are not needed. When a length of the DwPTS is 9, 10, 11, or 12 OFDM symbols, since a UpPTS interval for uplink transmission is present in some symbols starting from the last symbol in the special subframe, REs for DMRS transmission are present in symbols except for the symbols for the UpPTS interval. FIG. 21(a) illustrates a DMRS pattern when a length of the DwPTS is 11 or 12 OFDM symbols. FIG. 21(b) illustrates a DMRS pattern when a length of the DwPTS is 9 or 10 OFDM symbols.

Meanwhile, in two base stations interfering with each other, channel estimation through the DMRSs may be problematic if the last few OFDM symbols of a downlink subframe of any base station are punctured. This is because the DMRSs are present in the last two OFDM symbols of the downlink subframe in case of a normal subframe as shown in FIG. 20.

To solve this problem, according to the present invention, a DMRS pattern designed for use in a DwPTS present in a special subframe in a TDD radio frame structure, for example, the DMRS pattern of FIG. 21 may be used when some symbols are sequentially punctured from the last OFDM symbol of a downlink subframe. For instance, if a base station does not puncture the last symbol (e.g., as in the first to fourth embodiments), the DMRS pattern designed for the normal subframe may be used as shown in FIG. 20. Meanwhile, if a base station punctures the last few OFDM symbols (e.g., as in the fifth embodiment), the DMRS pattern designed for the DwPTS may be used as shown in FIG. 21. The DMRS pattern of FIG. 21(a) may be used to puncture the last one or two OFDM symbols, and the DMRS pattern of FIG. 21(b) may be used to puncture the last three or four OFDM symbols.

A base station may explicitly signal a DMRS pattern to be used in a UE through an upper layer signal or a physical layer signal or may cause the UE to implicitly identify a DMRS pattern to be used in a downlink subframe based on the number of punctured OFDM symbols of the last part of the corresponding downlink subframe. For example, when the last one or two OFDM symbols of a downlink subframe are punctured, the UE may define the DMRS pattern (FIG. 21(a)) designed for a DwPTS having a length of 11 or 12 OFDM symbols.

Embodiment 7

The seventh embodiment relates to a method, in downlink transmission of one of two base stations interfering with each other, for setting different RE puncturing patterns in every downlink subframes upon puncturing REs overlapping with a CRS pattern of the other base station.

For example, in the above-described first to sixth embodiments, the first base station may apply different RE puncturing patterns according to the configuration of an MBSFN subframe of the second base station. The MBSFN subframe is essentially used for a Multimedia Broadcast and Multicast Service (MBMS) which simultaneously transmits the same signal in the same cell. Accordingly, an RS transmission scheme defined in the MBSFN subframe differs from a unicast scheme in which different data is transmitted to each cell.

Specifically, for a subframe set by the second base station as a normal subframe, the first base station may puncture REs overlapping with CRSs present in both a PDCCH area and a PDSCH area of a downlink subframe of the second base station. FIGS. 13, 14, 16, 17, 18, and 19 show embodiments of such an operation.

Figure 22:
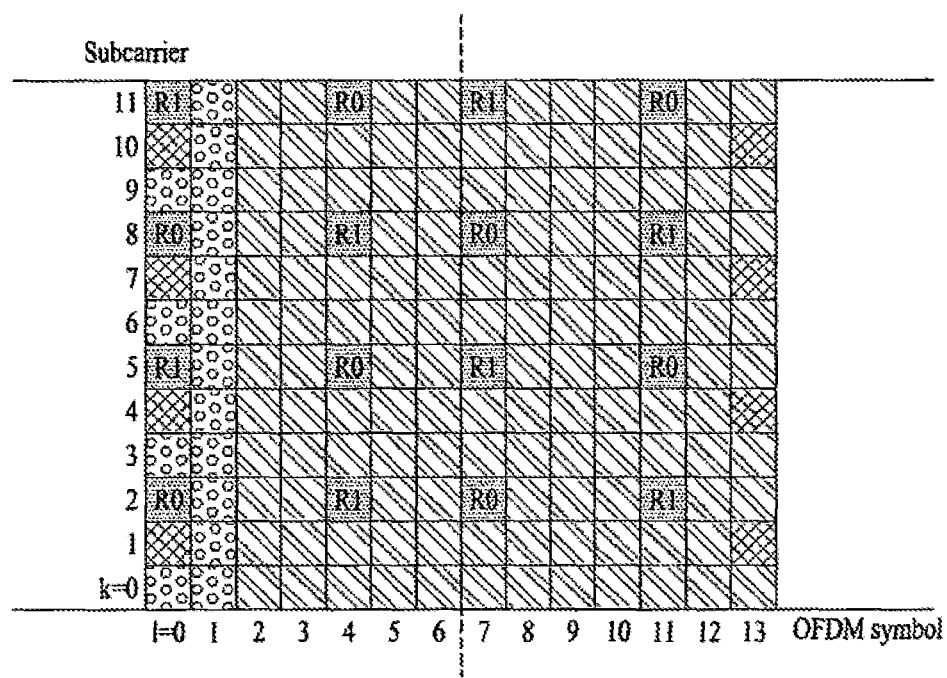
FIG. 22 shows exemplary REs punctured in a downlink subframe according to the present invention.

Meanwhile, for a subframe set by the second base station as an MBSFN subframe, the first base station may puncture REs overlapping with CRSs present in the PDCCH area (i.e., OFDM symbols 0 and 1) of the MBSFN subframe of the second base station, and may not puncture REs overlapping CRSs present in the PDSCH area (i.e., OFDM symbols 2 to 13) of the MBSFN subframe of the second base station. FIG. 22 shows an embodiment of such an operation.

FIG. 22 illustrates an example of puncturing REs in a first base station in the case where a downlink subframe of a second base station is set as the MBSFN subframe, when a subframe boundary of one of two cells interfering with each other is shifted by one OFDM symbol from a subframe boundary of the other cell as shown in FIG. 16. In this way, if the number of REs punctured in the first base station is reduced according to the configuration of the MBSFN subframe of the second base station, a data rate of a UE served by the first base station can be increased without affecting CRS measurement in a UE served by the second base station (i.e., in a UE which is subject to interference from the first base station).

For such an operation, the first and second base stations may exchange MBSFN subframe configuration information, and each of the base stations may inform a corresponding UE of MBSFN subframe configuration information of the other base station (or information about a puncturing pattern to be applied to a corresponding subframe) through an upper layer signal or a physical layer signal. The UE may recognize a proper puncturing pattern to be applied to a corresponding subframe through the received information. For example, the UE may distinguish between a normal subframe and an MBSFN subframe through subframe index information and the MBSFN subframe configuration information so that it may apply a proper RE puncturing pattern according to a corresponding subframe.

Embodiment 8

In the eighth embodiment, an RE puncturing operation for reducing ICI is described in detail when a subframe boundary of one first base station is shifted by one or more OFDM symbols from a subframe boundary of the other base station in two base stations interfering with each other.

Figure 23:
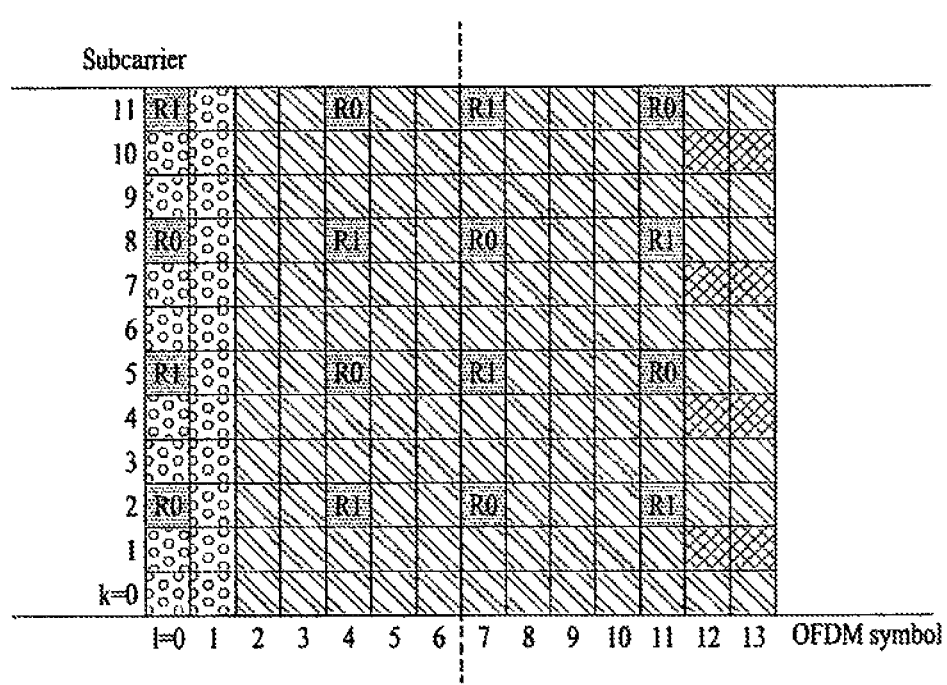
FIG. 23 shows exemplary REs punctured in a downlink subframe according to the present invention.

FIG. 23 illustrates an example of puncturing REs in a first base station in the case where a downlink subframe of a second base station is set as an MBSFN subframe when a subframe boundary of one base station is shifted by 2 OFDM symbols from a subframe boundary of the other base station. The example of FIG. 23 has an advantage of not performing RE puncturing in a control area of a downlink subframe of the first base station. That is, PDCCH areas of respective downlink subframes of the two base stations interfering with each other may be prevented from overlapping with each other. Since a PDCCH area in an LTE system may have a maximum length of 4 OFDM symbols, the PDCCH areas of the two base stations do not overlap if a subframe boundary of one of two base stations interfering with each other is shifted by 4 or more OFDM symbols from a subframe boundary of the other base station.

Figure 24:
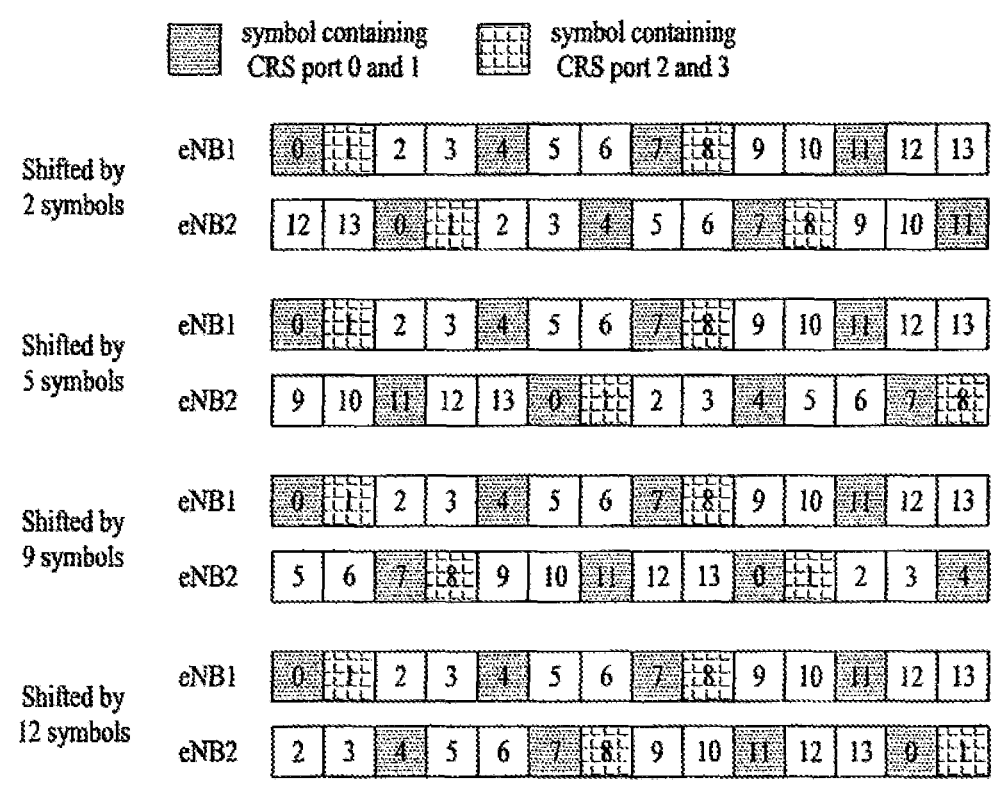

If a subframe boundary of one of two base stations is shifted by a plurality of OFDM symbols from a subframe boundary of the other base station, OFDM symbols to which CRSs of the two base stations are transmitted may be shifted to non-overlapping locations when considering this case. In the LTE system, CRS antenna ports 0 and 1 are located in OFDM symbol indexes 0, 4, 7, and 11 and CRS antenna ports 2 and 3 are located in OFDM symbol indexes 1 and 8. Hence, a subframe shift may be applied as shown in FIG. 24. FIG. 24 shows exemplary subframe shifts when each of a first base station (eNB1) and a second base station (eNB2) transmits CRSs (CRS ports 0, 1, 2, and 3) over four antenna ports. As shown in FIG. 24, a downlink subframe boundary of one of two base stations may be shifted by 2, 5, 9, or 12 OFDM symbols from a downlink subframe boundary of the other base station so that OFDM symbols for transmitting CRSs in PDCCH areas of downlink subframes of two base stations interfering with each other do not overlap.

Figure 25:
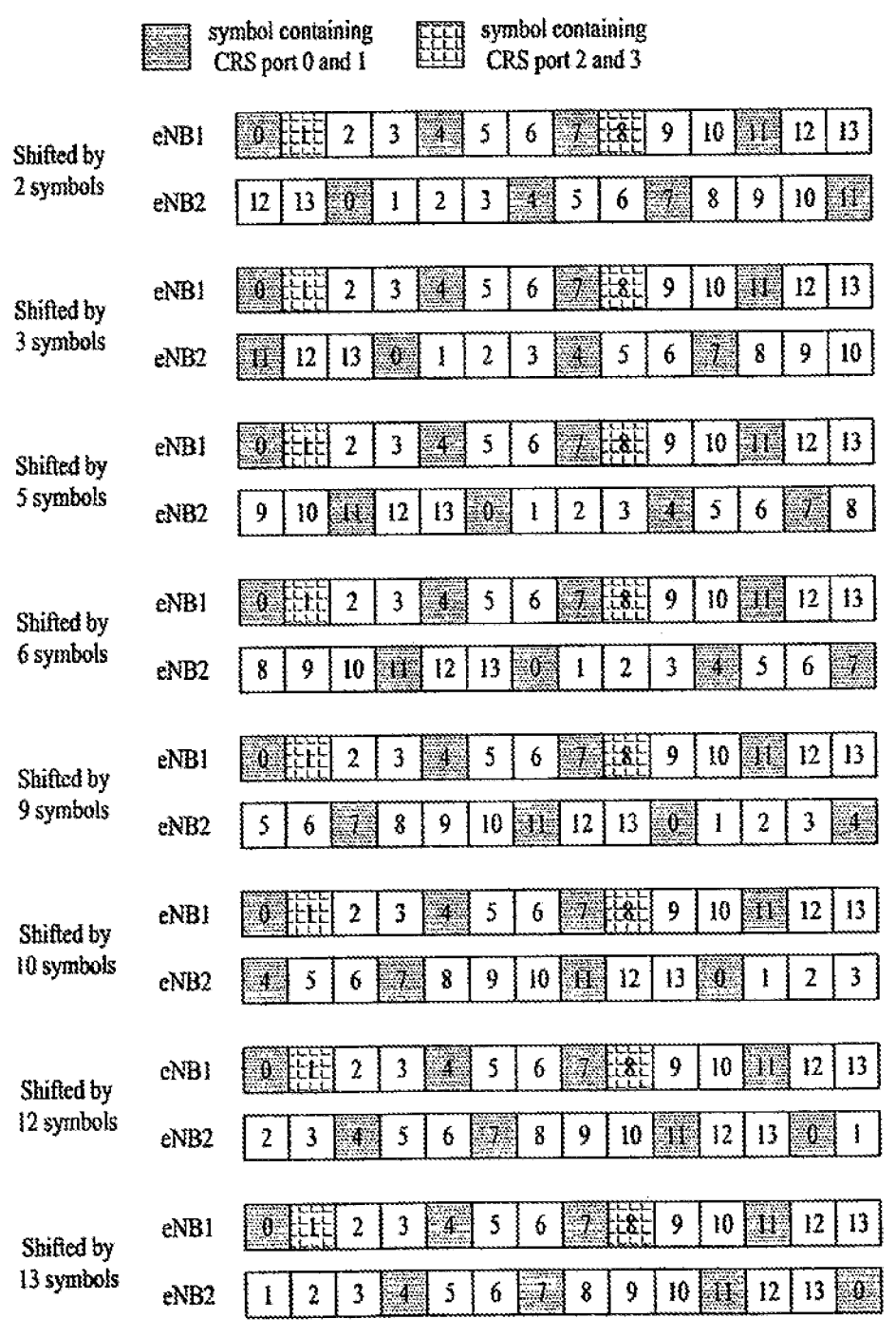

Alternatively, if the number of antenna ports of the second base station is limited to 2 or less, a subframe shift shown in FIG. 25 may be performed so that OFDM symbols for transmitting CRSs of two base stations interfering with each other do not overlap. This may be usefully applied when the second base station is an HeNB. FIG. 25 illustrates exemplary subframe shifts when a first base station (eNB1) transmits CRSs (CRS ports 0, 1, 2, and 3) over 4 antenna ports and a second base station (eNB2) transmits CRSs (CRS ports 0 and 1) over two antenna ports. As shown in FIG. 25, a downlink subframe boundary of one of two base stations may be shifted by 2, 3, 5, 6, 9, 12 or 13 OFDM symbols from a downlink subframe boundary of the other base station so that OFDM symbols for transmitting CRSs in PDCCH areas of downlink subframes of two base stations interfering with each other do not overlap.

Embodiment 9

The above-described fifth embodiment (FIGS. 18 and 19) is a method for preventing interference with a control channel of a second base station by puncturing the last k OFDM symbols of a subframe in a first base station when a subframe boundary of the first base station is shifted by k (where k≥1) OFDM symbols. In the ninth embodiment, a method is described for partially puncturing OFDM symbols in the middle of a downlink subframe of one base station when a subframe boundary of one of two base stations interfering with each other is shifted with respect to a subframe boundary of the other base station.

As in a part of the embodiments of FIGS. 24 and 25, if a subframe boundary of one of two base stations interfering with each other is shifted by a large number of OFDM symbols (e.g., 3 or more OFDM symbols) from a subframe boundary of the other base station, too many OFDM symbols are not transmitted when a base station, a subframe boundary of which is shifted, punctures the shifted OFDM symbols sequentially from the last symbol of a downlink subframe, thereby greatly lowering transmission capabilities. Accordingly, the present embodiment proposes puncturing OFDM symbols, in a downlink subframe of a first base station, overlapping with control channel transmission OFDM symbols of a second base station.

Figure 26:
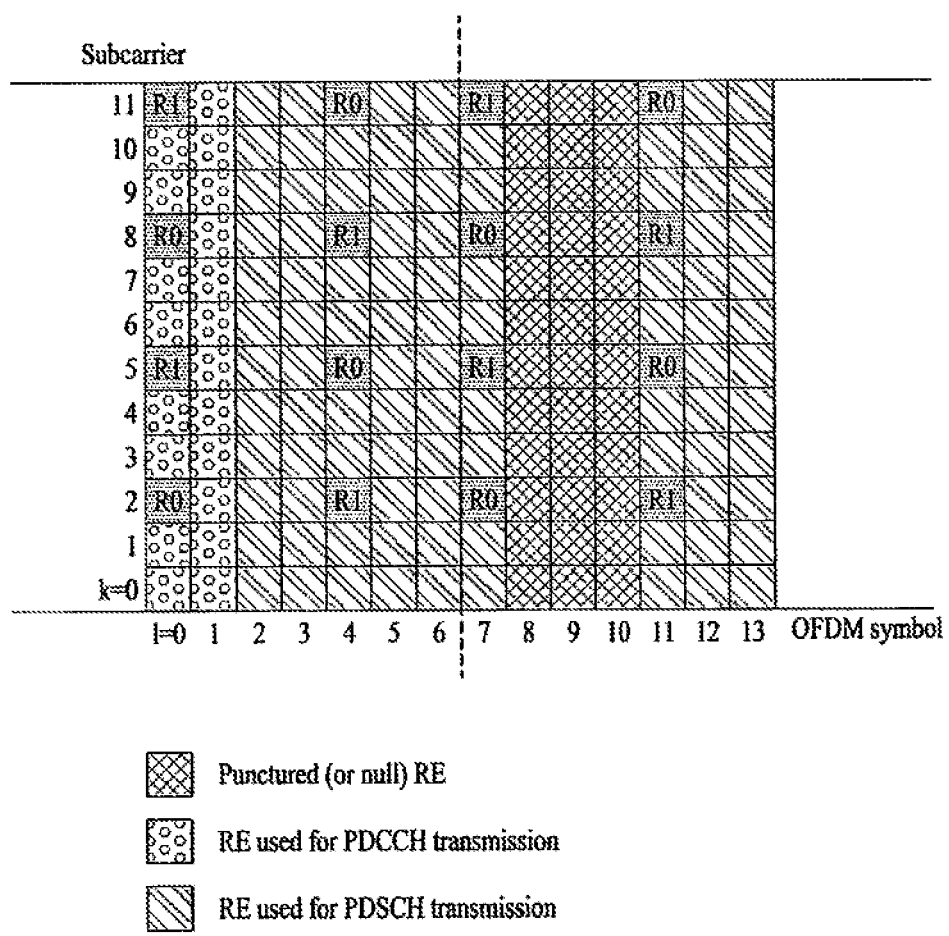
FIG. 26 shows exemplary REs punctured in a downlink subframe according to the present invention.

For example, if a subframe boundary of one of two base stations interfering with each other is shifted by 6 OFDM symbols from a subframe boundary of the other base station as shown in FIG. 26, OFDM symbols (8, 9, and 10 in FIG. 26) of a downlink subframe of a first base station overlapping with control channel transmission OFDM symbols (OFDM symbols 0, 1, and 2 of a subframe of a second base station) of the second base station may be punctured.

Although FIG. 26 shows non-puncturing REs overlapping with CRS transmission REs of the second base station in the downlink subframe of the first base station, the present embodiment is not limited thereto. Namely, in the embodiment of FIG. 16, REs overlapping with CRS transmission REs of the second base station in the downlink subframe of the first base station may be additionally punctured.

Alternatively, if a subframe boundary of one of two base stations interfering with each other is shifted by one half of a subframe (e.g., by 13 OFDM symbols) from a subframe boundary of the other base station, punctured OFDM symbols of the first base station overlapping with the control channel transmission OFDM symbols of the second base station may be present in the front part of the subframe.

In this way, in order to perform an operation for puncturing a part of OFDM symbols of the middle of one subframe, a base station may inform a UE of the number of shifted and/or punctured OFDM symbols in a subframe through an upper layer signal or a physical layer signal.

In all of the above-described embodiments of the present invention, punctured REs (i.e., REs overlapping with CRS transmission REs of the second base station and/or OFDM symbols overlapping with the control channel transmission OFDM symbols of the second base station) in the downlink subframe of the first base station are purely exemplary and the present invention includes puncturing only a part of corresponding REs. For example, REs may partially punctured in either a PDCCH area or a PDSCH area, or only REs corresponding to some CRS antenna ports may be punctured. Moreover different RE puncturing patterns may be applied to each subframe (e.g., according to MBSFN subframe configuration). Thus, one or more methods for applying RE puncturing may be simultaneously or independently applied.

When an RE puncturing pattern is applied according to all the above-described embodiments, it is necessary to determine a DMRS pattern to be used in a corresponding subframe. For example, when OFDM symbols 8, 9, and 10 in one subframe are punctured as shown in FIG. 26, a DMRS pattern for a DwPTS having a length of 9 or 10 OFDM symbols shown in FIG. 21(b) may be used. Here, a base station and a UE may determine whether a DMRS pattern is influenced by an RE puncturing pattern of a corresponding subframe in order of a DMRS pattern for a normal subframe, a DMRS pattern for a DwPTS having a length of 11 or 12 OFDM symbols, and a DMRS pattern for a DwPTS having a length of 9 or 10 OFDM symbols. Then the base station and the UE may search for a DMRS pattern which is not influenced by an RE puncturing pattern (i.e., a DMRS pattern in which punctured REs do not coincide with DMRS transmission REs) and specify a counterpart operation to use a corresponding DMRS pattern.

Hereinafter, a method is described for signaling information informing UEs belonging to a specific base station of the locations of punctured or rate-matched REs when the specific base station performs puncturing or rate matching for coordination with another base station. REs which are punctured or rate-matched will be collectively referred to as punctured REs. Punctured REs mean REs which are subjected to interference caused by another base station. Information about the locations of punctured REs may include presence/absence of punctured REs in each subframe, a time and/or frequency offset between a punctured RE pattern and a reference pattern, the number of transmission antennas of a base station related to punctured REs, and the like. The information about the locations of punctured REs (or information about the locations of REs subjected to interference caused by another base station) is described in detail hereinbelow.

(1) Presence/Absence of Punctured REs in Each Subframe

Whether punctured REs are present in a corresponding subframe may be signaled in predetermined units (e.g., in units of a radio frame (10 ms) or a subframe (1 ms)). This may be signaled by a bit map method or a method for defining an index according to a specific pattern and indicating a corresponding index, through an upper layer signal or a physical layer signal.

(2) Time/Frequency Offset Between a Punctured RE Pattern and a Reference Pattern To indicate a punctured RE pattern, a reference pattern for puncturing REs is defined and a time/frequency offset from the reference pattern is indicated. If a CRS pattern used in each cell is determined through the time/frequency offset, the reference pattern may be defined as a pattern which is the same as a CRS pattern used in a corresponding base station or may be defined as an arbitrary RE puncturing pattern. Thus, since an RE puncturing pattern can be signaled to a UE by indicating to what extent a time/frequency offset is generated compared with the reference pattern, signaling overhead can be reduced compared with indicating the RE puncturing pattern itself.

(3) Number of Transmission Antennas of Other Cells

In two cells interfering with each other, locations of REs punctured in a first cell may be determined by locations of CRS transmission REs of a second cell. The number of CRS transmission REs may vary according to the number of transmission antennas used by a corresponding cell. Accordingly, a cell (i.e., the first cell) which informs a UE of information about punctured REs may signal the number of transmission antennas used by a cell (i.e., the second cell) related to the punctured REs to the UE.

(4) Use/Non-Use of MBSFN Mode

As is described in conjunction with FIGS. 22 and 23, upon determining punctured REs in a downlink subframe of a first cell in two cells interfering with each other, if a downlink subframe of a second cell is set to an MBSFN subframe (i.e., if only CRSs of a PDCCH area in a second cell are transmitted), UE capabilities can be improved by reducing the number of punctured REs in the downlink subframe of the first cell. For this operation, a base station performing RE puncturing may signal whether a subframe of another base station is an MBSFN subframe or a normal subframe with respect to a subframe to which RE puncturing is applied.

(5) Symbol Level Puncturing

Although RE puncturing may be performed in units of REs, it may also be performed in units of OFDM symbols as in the above-described fifth embodiment. Accordingly, upon puncturing all OFDM symbols, a base station may signal information indicting punctured symbols to a UE.

(6) Time Domain in which RE Puncturing is Performed

Signaling may be used to indicate whether RE puncturing is used in a specific time domain of downlink transmission. For example, performing RE puncturing in either a PDCCH area or a PDSCH area may be signaled. Alternatively, performing RE puncturing in either a first slot or a second slot may be signaled. Further, performing RE puncturing in one of N (N=14 in a normal CP) OFDM symbols or a plurality of OFDM symbols may be signaled. Through such signaling, whether RE puncturing is applied to various units of time domains (PDCCH/PDSCH, slots, OFDM symbols) may be informed.

The above-described signaling information may be signaled independently or by combination.

If RE puncturing and rate matching are mixed as described in the third embodiment, information which can distinguish between RE puncturing and rate matching may be signaled together with signaling information indicating whether punctured REs are present. Then a UE is able to recognize a null RE transmission scheme.

Hereinafter, a scenario to which the above-described RE puncturing (or RE muting) is applied is described. Application of the RE puncturing method may be adaptively determined according to whether there is a base station which subjects another base station to interference and/or according to capabilities of a UE which is subject to interference (e.g., whether a UE is a legacy UE supporting only 3GPP LTE release-8 or release-9 or an advanced UE supporting 3GPP LTE-A). More specifically, the following operational scenario may be considered. Hereinbelow, it is assumed that a downlink signal from a macro base station (MeNB) to a macro UE (MUE) is subject to interference by a downlink signal from a micro base station (HeNB) to a micro UE (HUE). That is, it is assumed that the HeNB is an interfering cell, the MeNB is a victim cell, and the MUE is a victim UE. However, the present invention is not limited thereto and the same principle of the present invention may be applied even when interference occurs between two arbitrary base stations.

(1) Case Where Both MUE and HUE are Legacy UEs

In this case, the HeNB should transmit null REs in CRS locations of the MeNB to prevent RLF of the MUE (i.e., to reduce interference). However, since the HUE cannot recognize transmission of the null REs, an operation for puncturing specific data (PDSCH) REs is performed by the HeNB.

(2) Case Where MUE is Legacy UE and HUE is Advanced UE

In this case, the HeNB also should transmit null REs in CRS locations of the MeNB to prevent RLF of the MUE. Meanwhile, since the HUE can be aware of the locations of the null REs, the HeNB may inform an HUE of the locations of the null REs and may perform rate matching in which data REs are not mapped to corresponding locations. Alternatively, the HeNB may inform the HUE of the locations of the null REs and the HUE may perform an operation in which corresponding REs are not used for data decoding.

(3) Case Where MUE is Advanced UE

In this case, the MUE may operate so as to perform radio link monitoring only with respect to resources having weak interference which are not transmitted by the HeNB in order to prevent unnecessary RLF. Since the HeNB is permitted to transmit data (PDSCH) in the locations of CRSs of the MeNB, an RE muting operation is not performed.

(4) Case where MUE is not Present in Adjacent Area of HeNB

In this case, since the MUE is not subject to interference from the HeNB, the HeNB may not perform the RE muting operation similarly to Case (3).

To perform an operation for reducing ICI according to the above-described scenario, the MeNB may transmit a signal informing the HeNB whether there is an MUE adjacent to the corresponding HeNB and, if an MUE adjacent to the HeNB is present, may transmit a signal indicating capabilities of the corresponding MUE, (e.g., whether the MUE is a legacy UE or an advanced UE). As a more direct method, the MeNB may transmit a signal informing the HeNB whether the corresponding HeNB is to perform RE muting. Whether to transmit this signal may be determined by the MeNB by judging to what extent a specific MUE is adjacent to the HeNB. For example, if a reception power level of an adjacent cell measured for the corresponding HeNB by the specific MUE is very high, the MeNB may transmit a signal for the ICI reduction operation to the HeNB.

If the advanced MUE has radio link monitoring capabilities with respect to only resources having weak interference, such resource-specific monitoring may be controlled by the MeNB to be performed only when the MUE is near the HeNB. Alternatively, the MUE may voluntarily perform the resource-specific monitoring. For example, the MUE generally performs radio link monitoring with respect to all resources but, if RLF occurs, the MUE may perform radio link monitoring only with respect to specific resources (the specific resources may be resources designated by a base station or may be resources determined as having weak interference through an interference power measured by the UE). If RLF does not occur in the resource-specific monitoring, the MUE may recognize that resource coordination is performed between an MeNB connected thereto and another eNB which creates strong interference therewith.

A description has been made hereinabove of an operation in which one base station (HeNB) does not transmit the PCFICH/PHICH/PDCCH and/or PDSCH in REs overlapping with CRS transmission REs of another base station (MeNB) and an operation of a UE (MUE) according thereto, in the case where ICI is very severe (e.g., when both the HeNB and the MeNB are present and the MUE is adjacent to the HeNB). These operations may be voluntarily performed by a UE without an additional signal (e.g., a signal for a CRS transmission pattern of an adjacent cell) from a base station. For example, if a UE (MUE) detects a strong CRS signal from an adjacent cell (HeNB), the MUE may decode corresponding channels using only REs except for REs which are subject to interference by CRSs of the corresponding adjacent cell (HeNB), in receiving and decoding the PCFICH/PHICH/PDCCH and/or PDSCH transmitted thereto from a serving cell (MeNB). Alternatively, if the interference strength of CRSs of an adjacent cell (HeNB) is above a given level as compared with the signal strength of a serving cell (MeNB), a UE (MUE) may be set to perform a decoding operation using REs except for REs which are subject to interference by CRSs of an adjacent cell (HeNB).

In the above-described various embodiments of the present invention, it should be noted that a UE performs decoding of a channel received from a serving cell by excluding only REs corresponding to CRSs of an adjacent cell even when any UE served by the serving cell is subject to severe interference by CRSs and data of an adjacent cell. Namely, a part corresponding to data of the adjacent cell is included in decoding of a UE. Such an operation by the UE may be performed such that a serving cell punctures REs overlapping with CRS transmission REs of an adjacent cell and signals the punctured REs to the UE, or the UE excludes REs overlapping with the CRS transmission REs of an adjacent cell producing severe interference without additional signaling. An operation for reducing ICI according to an exemplary embodiment of the present invention will now be described in detail with reference to FIG. 27.

Figure 27:
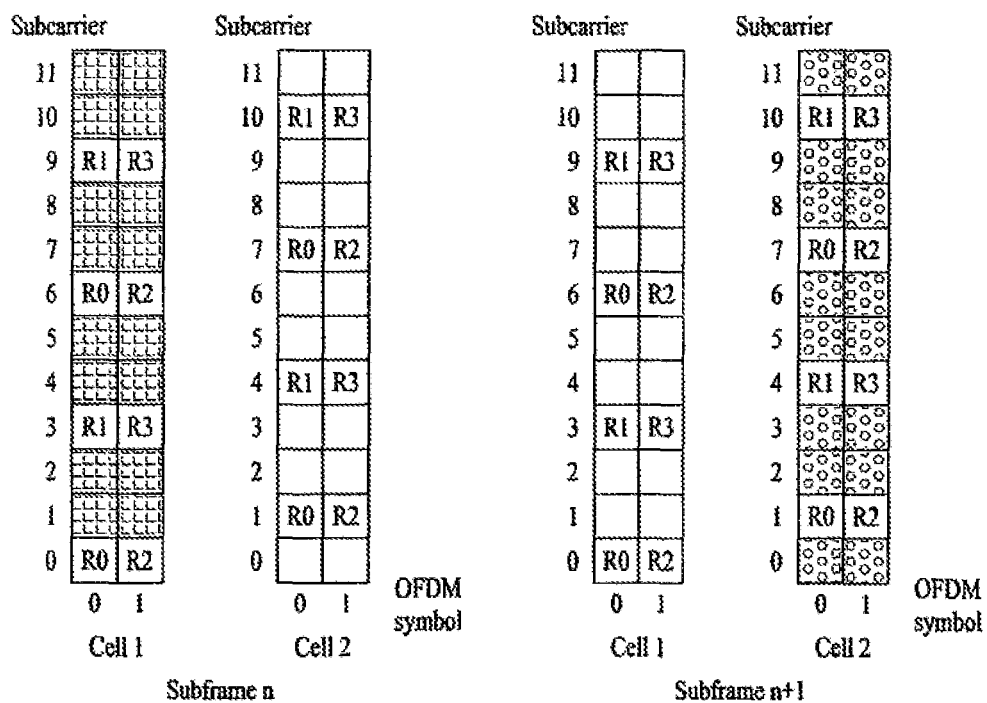
FIG. 27 is a diagram explaining an operation for reducing inter-cell interference according to an exemplary embodiment of the present invention.

In FIG. 27, it is assumed that a first cell (cell 1) is an interfering cell and a second cell (cell 2) is a victim cell. In other words, it is assumed that a UE served by the second cell is subject to strong interference by a signal from the first cell. As illustrated in FIG. 27, CRS transmission REs of one of the two cells are shifted by one subcarrier from CRS transmission REs of the other cell. For clarity of description, only OFDM symbols 0 and 1 of one subframe are shown and the other OFDM symbols of one subframe may transmit data from each cell and a UE may receive the symbols as in the above-described embodiments.

As shown in FIG. 27, a variety of control channels (PCFICH/PHICH/PDCCH) may be transmitted throughout the first two OFDM symbols (0 and 1) of one subframe. A UE served by the second cell (cell 2) may measure interference from the first cell (cell 1) in a subframe n. As denoted by oblique lines in the subframe n shown in FIG. 27, the first cell may transmit control channel signals thereof in the OFDM symbols 0 and 1. In terms of the UE, both CRSs (R0, R1, R2, and R3), and signals (indicated by oblique lines) except for the CRSs are determined as creating strong interference. To solve such severe interference, the first cell may perform an operation in which all signals except for the CRSs are not transmitted in a subframe n+1. In any downlink subframe, if only CRSs are transmitted and all signals except for the CRSs are not transmitted, such a subframe may be referred to as an Almost Blank Subframe (ABS). In this way, if the first cell sets the subframe n+1 as an ABS and transmits the ABS, the UE may expect an ABS transmission operation of the first cell and may receive a channel in the subframe n+1 from the second cell. Specifically, in the subframe n+1, the UE may perform channel decoding using REs except for CRS transmission REs (subcarrier locations 0, 3, 6, and 9 of OFDM symbols 0 and 1) under the assumption that the first cell creates interference only due to CRS transmission. In other words, REs (e.g., a subcarrier 2 of the OFDM symbol 0) which are subject to interference from signals except for the CRSs of the first cell may be used for channel decoding by the UE even if strong interference is detected in a part of subframes, such as the subframe n.

Figure 28:
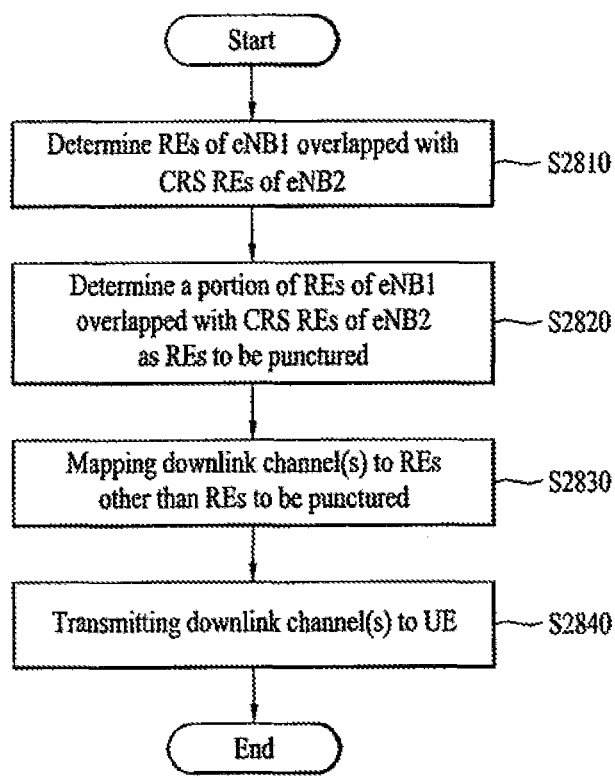
FIG. 28 is a flowchart showing a process for reducing inter-cell interference according to an exemplary embodiment of the present invention.

FIG. 28 is a flowchart illustrating a process for reducing ICI according to an exemplary embodiment of the present invention. In describing the process, it is assumed that there are two cells (i.e., a first cell and a second cell) interfering with each other. The following description may be applied to the case where the first cell is an interfering cell and the second cell is a victim cell, or the case where the first cell is a victim cell and the second cell is an interfering cell.

In step S2810, the first cell (eNB1) may determine REs overlapping with CRS transmission REs of a downlink subframe of the second cell (eNB2) among REs of a downlink subframe thereof. A CRS pattern of any cell may be determined by factors such as the number of transmission antennas of a corresponding cell, a type of a downlink subframe (whether a downlink subframe is a normal subframe or an MBSFN subframe), a shift (time shift) in a subframe boundary, a frequency shift (V-shift) of a CRS pattern, etc.

In step S2820, a portion of the REs determined in step S2810 may be determined as REs to be punctured. The REs determined in step S2810 correspond to REs overlapping with the CRS transmission REs of the downlink subframe of the second cell among the REs of the downlink subframe of the first cell. The present invention does not exclude the case where all of the REs determined in step S2820 are determined as REs to be punctured. However, the efficiency of interference coordination can be raised without greatly lowering the efficiency of data transmission by determining only necessary REs among REs related to interference as REs to be punctured.

The partial REs determined as REs to be punctured among the REs determined in step S2810 may be REs present in a control area and/or a data area of the downlink subframe of the first cell. In addition, the partial REs determined as REs to be punctured among the REs determined in step S2810 may be REs corresponding to a part of CRS transmission antenna ports of the second cell.

In step S2820, the punctured REs may be separately determined according to downlink subframes of the first cell. Namely, different RE puncturing patterns may be applied to each subframe. In addition to the REs determined in step S2810, the REs to be punctured in step 2820 may further include REs overlapping with a PDCCH transmission area of the downlink subframe of the second cell among REs of the downlink subframe of the first cell. Furthermore, the first cell may transmit information indicating the RE puncturing pattern to a served UE.

In step S2830, the first cell may map a PDCCH, a PDSCH, etc. to REs except for REs punctured in a downlink subframe thereof. In steps S2840, the first cell may transmit the PDCCH, PDSCH, etc. mapped to the downlink subframe to a UE.

Details described in the above embodiments of the present invention may be independently applied or two or more embodiments may be simultaneously applied to the ICI reduction process described in conjunction with FIG. 28. A repeated description is omitted for clarity.

Figure 29:
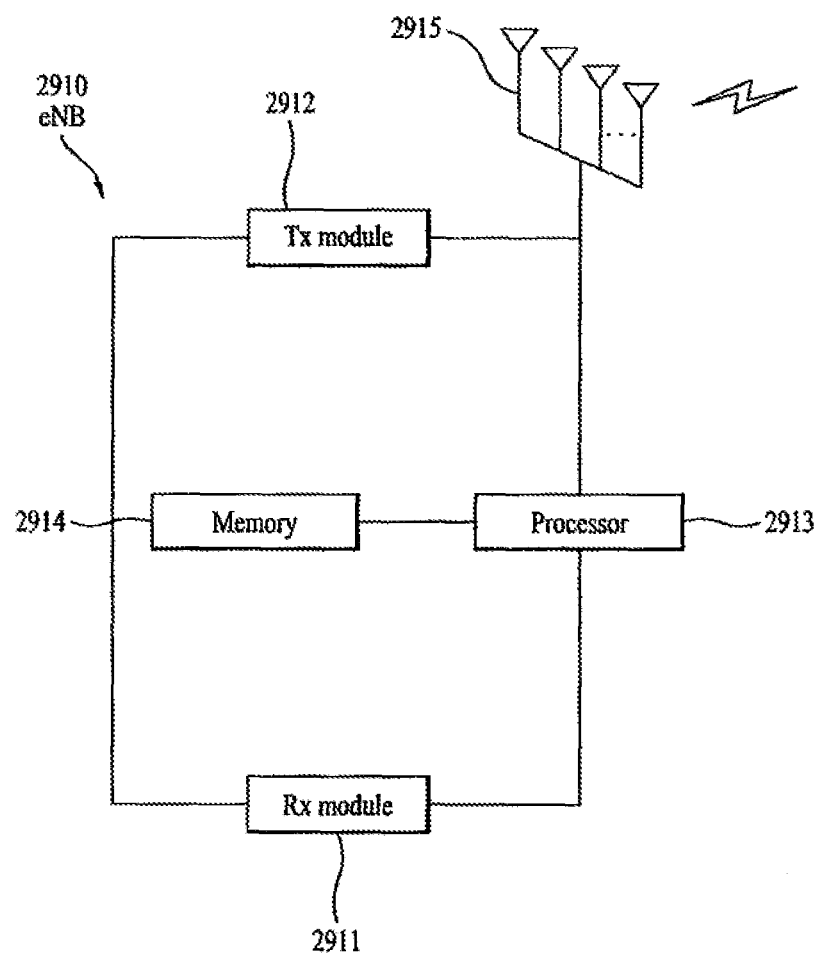
FIG. 29 is a diagram showing a base station (eNB) device according to an exemplary embodiment of the present invention.

FIG. 29 is a diagram illustrating a configuration of an eNB device 2910 according to an exemplary embodiment of the present invention.

Referring to FIG. 29, the eNB device 2910 may include a reception module 2911, a transmission module 2912, a processor 2913, a memory 2914, and a plurality of antennas 2915. The plurality of antennas 2915 supports MIMO transmission and reception. The reception module 2911 may receive signals, data, and information in downlink from a UE. The transmission module 2912 may transmit signals, data, and information in downlink to the UE. The processor 2913 may control the overall operation of the eNB device 2910.

The eNB device 2910 according to an exemplary embodiment of the present invention may be configured to reduce ICI. In describing the eNB device according to the exemplary embodiment of the present invention, it is assumed that there are two cells (i.e., a first cell and a second cell) interfering with each other. The following description may be applied to the case where the first cell is an interfering cell and the second cell is a victim cell, or the case where the first cell is a victim cell and the second cell is an interfering cell. The processor 2913 of the eNB device 2910 may control signal transmission and reception of the first cell through the transmission module 2913 and the reception module 2911. The processor 2913 may be configured to determine REs overlapping with CRS transmission REs of a downlink subframe of the second cell in a downlink subframe of the first cell. The processor 2913 may be configured to determine a part of REs overlapping with CRS transmission REs of the downlink subframe of the second cell in the downlink subframe of the first cell as REs to be punctured. The processor 2913 may be configured to map one or more downlink channels to the downlink subframe of the first cell except for the punctured REs and to transmit one or more downlink channels mapped to the downlink subframe of the first cell to the UE through the transmission module 2912.

While the processor 2913 of the eNB device 2910 determines the REs overlapping with the CRS transmission REs of the downlink subframe of the second cell among REs of the downlink subframe the first cell, a CRS pattern may be determined by factors such as the number of transmission antennas of a corresponding cell, a type of a downlink subframe (whether a downlink subframe is a normal subframe or an MBSFN subframe), a shift (time shift) in a subframe boundary, a frequency shift (V-shift) of a CRS pattern, etc. In addition, the punctured REs determined by the processor 2913 may be REs present in a control area and/or a data area of the downlink subframe of the first cell or REs corresponding to a part of CRS transmission antenna ports of the second cell among the REs present in a control area and/or a data area of the downlink subframe of the first cell. Furthermore, the punctured REs determined by the processor 2913 may further include REs overlapping with a PDCCH transmission area of the downlink subframe of the second cell among REs of the downlink subframe of the first cell. Moreover, the processor 2913 may be configured to separately determine the punctured REs according to downlink subframes of the first cell. The processor 2913 may be configured to transmit information indicating an RE puncturing pattern to the UE.

The processor 2913 of the eNB device 290 performs an operation processing function for information received by the eNB device 2910 and information to be transmitted to an external device. The memory 2914 stores the processed information for a given time and may be replaced with a constituent element such as a buffer (not shown).

Descriptions of the above embodiments of the present invention may be independently applied or two or more embodiments may be simultaneously applied to the configuration of the eNB device. A repeated description is omitted for clarity.

A description of the eNB device 2910 of FIG. 29 may be identically applied to a relay device as a downlink transmission subject or an uplink reception subject.

The above-described embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

The embodiments of the present invention are applicable to various mobile communication systems.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of a first cell for supporting a downlink channel demodulation at a user equipment, the method comprising:
   transmitting, by the first cell to the user equipment via a higher layer signaling, information on a Cell-specific Reference Signal (CRS) of a second cell including Multicast/Broadcast over Single Frequency Network (MBSFN) subframe configuration information of the second cell; and
   transmitting, by the first cell to the user equipment, a downlink signal on the downlink channel,
   wherein the information on the CRS of the second cell is used by the user equipment to demodulate the downlink channel from the first cell.

2. The method of claim 1, wherein the information on the CRS of the second cell further includes a number of CRS antenna ports of the second cell.

3. The method of claim 1, wherein the MBSFN subframe configuration information indicates one or more subframes not containing the CRS in a data region.

4. The method of claim 1, wherein the MBSFN subframe configuration information indicates one or more subframes containing the CRS only in a control region.

5. The method of claim 1, wherein the information on the CRS of the second cell is used by the user equipment to mitigate inter-cell interference from the CRS of the second cell.

6. The method of claim 1, wherein the downlink channel is a physical downlink shared channel (PDSCH) or a physical downlink control channel (PDCCH).

7. The method of claim 1, wherein the first cell is a serving cell and the second cell is a neighbor cell.

8. A method of a user equipment for demodulating a downlink channel, the method comprising:
   receiving, by the user equipment from a first cell via a higher layer signaling, information on a Cell-specific Reference Signal (CRS) of a second cell including Multicast/Broadcast over Single Frequency Network (MBSFN) subframe configuration information of the second cell; and
   receiving, by the user equipment from the first cell, a downlink signal on the downlink channel, wherein the information on the CRS of the second cell is used by the user equipment to demodulate the downlink channel from the first cell.

9. A base station of a first cell for supporting a downlink channel demodulation at a user equipment, the base station comprising:
 a receiver;
 a transmitter; and
 a processor configured to:
  transmit, to the user equipment via a higher layer signaling, information on a Cell-specific Reference Signal (CRS) of a second cell including Multicast/Broadcast over Single Frequency Network (MBSFN) subframe configuration information of the second cell, and
  transmit, via the transmitter to the user equipment, a downlink signal on the downlink channel,
  wherein the information on the CRS of the second cell is used by the user equipment to demodulate the downlink channel from the first cell.

10. A user equipment for demodulating a downlink channel, the user equipment comprising:
 a receiver;
 a transmitter; and
 a processor configured to:
  receive, from a first cell via a higher layer signaling, information on a Cell-specific Reference Signal (CRS) of a second cell including Multicast/Broadcast over Single Frequency Network (MBSFN) subframe configuration information of the second cell, and
  receive, via the receiver from the first cell, a downlink signal on the downlink channel,
  wherein the information on the CRS of the second cell is used by the user equipment to demodulate the downlink channel from the first cell.

* * * * *